United States Patent [19]

Eguchi et al.

[11] Patent Number: 5,374,996
[45] Date of Patent: Dec. 20, 1994

[54] IMAGE PROCESSING SYSTEM

[75] Inventors: Kazuhiro Eguchi, Kasuga; Kimio Morimoto, Dazaifu; Yoichi Okoga, Fukuoka, all of Japan

[73] Assignee: Matsushita Electric Industrial Co., Ltd., Osaka, Japan

[21] Appl. No.: 904,931

[22] Filed: Jun. 26, 1992

[30] Foreign Application Priority Data

Jun. 26, 1991 [JP] Japan .................. 3-154440
Jun. 26, 1991 [JP] Japan .................. 3-154441
Jun. 26, 1991 [JP] Japan .................. 3-154443

[51] Int. Cl.⁵ ........................... G06F 15/62
[52] U.S. Cl. ........................ 358/458; 358/455; 358/280; 358/518
[58] Field of Search ......... 358/458, 76, 280, 80, 358/284, 93, 283, 298, 443, 464, 456, 285, 75, 462, 78, 406, 10, 206, 453, 452, 209, 163, 168

[56] References Cited

U.S. PATENT DOCUMENTS

| | | | |
|---|---|---|---|
| 4,467,364 | 8/1984 | Konagaya | 358/280 |
| 4,667,250 | 5/1987 | Murai | 358/283 |
| 4,733,306 | 3/1988 | Matsunawa et al. | 358/280 |
| 4,887,163 | 12/1989 | Maeshima | 358/443 |
| 4,891,692 | 1/1990 | Outa | 358/75 |
| 5,031,035 | 7/1991 | Abe | 358/80 |
| 5,057,914 | 10/1991 | Tsuji et al. | 358/78 |
| 5,111,309 | 5/1992 | Sakata | 358/455 |
| 5,126,856 | 6/1992 | Abe | 358/406 |
| 5,130,791 | 7/1992 | Abe | 358/80 |
| 5,157,497 | 10/1992 | Topper et al. | 358/209 |
| 5,216,498 | 6/1993 | Matsumawa et al. | 358/75 |

*Primary Examiner*—Paul Ip
*Attorney, Agent, or Firm*—Lowe, Price, LeBlanc & Becker

[57] ABSTRACT

An image processing system for reading multi-level image data corresponding to each pixel of an input image from a multi-tone-level draft image such as a photograph and correcting a density level at each of the pixels, which is represented by the obtained image data, and outputting data representing corrected density levels. The image processing system first performs an appropriate sampling of the read image data of the pixels at a sampling rate in such a manner to enable reference to the density levels at the pixels when correcting the density levels. The sampling rate is most appropriately predetermined.

16 Claims, 22 Drawing Sheets

| 221 | 68 | 153 | 238 |
|-----|----|----|-----|
| 85 | 0 | 51 | 136 |
| 102 | 17 | 34 | 187 |
| 204 | 119 | 170 | 255 |

| ADDRESS | RAM |
|---|---|
| 0 | 0 |
| 1 | 1 |
| ⋮ | ⋮ |
| 100 | 110 |
| 101 | 110 |
| ⋮ | ⋮ |
| 200 | 190 |
| 201 | 192 |
| ⋮ | ⋮ |
| 255 | 255 |

FIG. 21
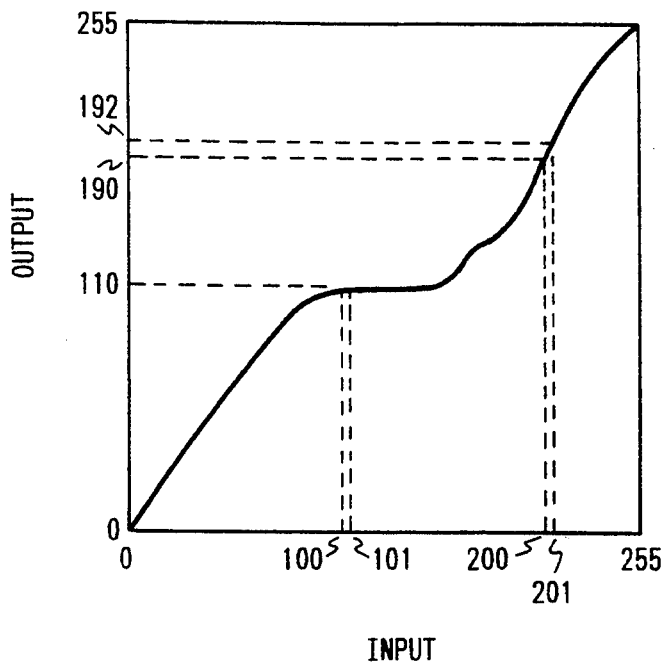
FIG. 22
| 221 | 68 | 153 | 238 |
| --- | --- | --- | --- |
| 85 | 0 | 51 | 136 |
| 102 | 17 | 34 | 187 |
| 204 | 119 | 170 | 255 |
FIG. 23
DRAFT PICTURE
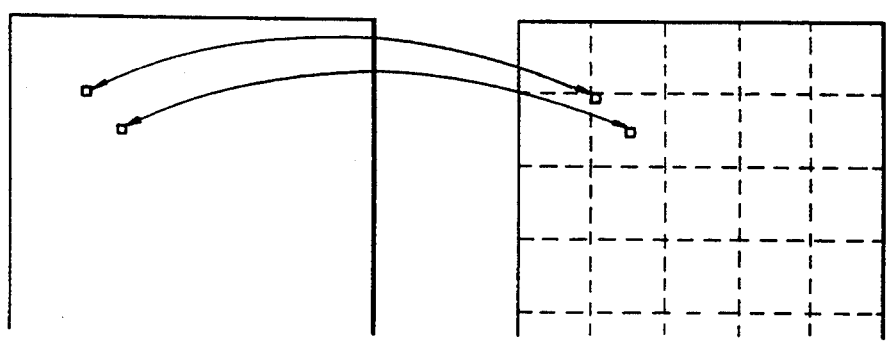

FIG. 26

MULTI-LEVEL IMAGE DATA

|   | a | b | c | d | e | f |
|---|---|---|---|---|---|---|
| 1 | 89 | 86 | 84 | 60 | 77 | 72 |
| 2 | 88 | 89 | 86 | 79 | 75 | 69 |
| 3 | 85 | 83 | 80 | 73 | 70 | 66 |
| 4 | 61 | 78 | 75 | 71 | 68 | 63 |
| 5 | 79 | 74 | 71 | 67 | 64 | 59 |
| 6 | 75 | 70 | 65 | 61 | 59 | 57 |

← COMPARISON →

HALFTONE-DOT PATTERN TABLE

| 221 | 68 | 153 | 238 |
|---|---|---|---|
| 85 | 0 | 51 | 136 |
| 102 | 17 | 34 | 187 |
| 204 | 119 | 170 | 255 |

⇓ BINARIZATION

BINARY IMAGE DATA

|   | a | b | c | d | e | f |
|---|---|---|---|---|---|---|
| 1 | ○ | ○ | ○ | ○ | ○ | ● |
| 2 | ○ | ○ | ○ | ○ | ○ | ● |
| 3 | ○ | ○ | ○ | ● | ● | ● |
| 4 | ● | ○ | ● | ● | ● | ● |
| 5 | ○ | ● | ● | ● | ● | ● |
| 6 | ○ | ● | ● | ● | ● | ● |

FIG. 27

MULTI-LEVEL IMAGE DATA

|   | a | b | c | d | e | f |
|---|---|---|---|---|---|---|
| 1 | 230 | 228 | 15 | 14 | 11 | 10 |
| 2 | 230 | 210 | 16 | 12 | 10 | 9 |
| 3 | 222 | 13 | 10 | 11 | 10 | 10 |
| 4 | 226 | 13 | 12 | 11 | 12 | 10 |
| 5 | 12 | 11 | 10 | 13 | 10 | 11 |
| 6 | 10 | 9 | 10 | 11 | 10 | 10 |

COMPARISON ↔

HALFTONE-DOT PATTERN TABLE

| 221 | 68 | 153 | 238 |
|---|---|---|---|
| 85 | 0 | 51 | 136 |
| 102 | 17 | 34 | 187 |
| 204 | 119 | 170 | 255 |

⇓ BINARIZATION

BINARY IMAGE DATA

|   | a | b | c | d | e | f |
|---|---|---|---|---|---|---|
| 1 | ○ | ○ | ● | ● | ● | ● |
| 2 | ○ | ○ | ● | ● | ● | ● |
| 3 | ○ | ● | ● | ● | ● | ● |
| 4 | ○ | ● | ● | ● | ● | ● |
| 5 | ● | ● | ● | ● | ● | ● |
| 6 | ● | ● | ● | ● | ● | ● |

| ADDRESS | RAM |
|---|---|
| 0 | 0 |
| 1 | 1 |
| ⋮ | ⋮ |
| 100 | 110 |
| 101 | 110 |
| ⋮ | ⋮ |
| 200 | 190 |
| 201 | 192 |
| ⋮ | ⋮ |
| 255 | 255 |

| 221 | 68 | 153 | 238 |
|-----|----|----|-----|
| 85  | 0  | 51  | 136 |
| 102 | 17 | 34  | 187 |
| 204 | 119| 170 | 255 |

DRAFT PICTURE

IMAGE PROCESSING SYSTEM

BACKGROUND OF THE INVENTION

1. Field of The Invention

This invention relates to an image processing system for performing a processing such as a tone correction on image data optically read from a photograph or the like and thereafter outputting processed image data.

2. Description of The Related Art

In recent years, with advance of image processing techniques, an image processing system, which can read image data of a picture or the like and perform various processings on the image data and also can edit the image data by, for example, "pasting" or placing an image represented by the image data on a document, has come to require a variety of functions and an improvement in operability.

A conventional image processing system has a function of a tone correction, by which a tone of read image data is converted into another tone arbitrarily indicated by an operator. In such a case, a desired tone-correction rate or degree can be set by first displaying a curve graph (hereunder sometimes referred to as a tone curve or as a tone correction curve), in which tone levels (namely, densities) of input image data are plotted in abscissa (namely, in horizontal axis) and tone levels of output image data obtained by performing a tone correction on the tone of the input image data are plotted in ordinate (namely, in vertical axis), as illustrated in FIG. 39 and next modifying the tone curve by using an input means such as a mouse. In case of FIG. 39, a tone curve 1 corresponds to a case where a tone level of output image data is equal to a tone level of corresponding input image data (namely, output image data is obtained from input image data without any conversion or modification). Further, as shown in FIG. 39, a tone curve 2 is entirely lower than the tone curve 1. Thus, in case of employing the tone curve 2, an output image represented by the output image data is lighter than an input image represented by the input image data. In contrast, a tone curve 3 is entirely higher than the tone curve 1. Thus, in case of employing the tone curve 3, an output image represented by the output image data is darker than an input image represented by the input image data. Further, a portion of an output image, which is represented by tone levels of a steep portion of a tone curve, is enhanced in comparison with a corresponding input image. Conversely, another portion of the output image, which is represented by tone levels of a gentle portion of the tone curve, is blurred or scumbled in comparison with the corresponding input image.

To set such a tone curve, information on densities at arbitrary positions (namely, of arbitrary pixels) of an original image (or an input image) and the distribution of densities of pixels of the original image is necessary. Thus, in case of a conventional image processing system, multi-level density data (hereunder sometimes referred to as multi-level image data) obtained as a result of a tone correction performed on image data read from the original image is not only converted into binary data (or halftone-dot data) to be displayed on a screen of a cathode-ray-tube (CRT) of a display device thereof, such multi-level data itself is also stored in a random access memory (RAM) thereof.

Hereinafter, a conventional image processing system will be described.

FIG. 40 is a schematic block diagram for illustrating the configuration of the conventional image processing system. Reference numeral 21 designates a central processing unit (CPU) for controlling the system and processing data; 22 a RAM for storing 8-bit 256-level image data, which represents the density of each pixel with 256 levels, as the above described multi-level density data; 23 what is called a page memory for storing binary data converted from the multi-level image data stored in the RAM 22 under the control of the CPU 21; 24 an image input unit for optically reading a draft such as a photograph, for performing a tone correction on the read image data and for transferring the corrected data to the RAM 22; 25 a CRT display unit; and 26 a printer.

FIG. 41 is a schematic block diagram for illustrating the configuration of the image input unit 24 of the image processing system of FIG. 40. Reference numeral 27 denotes a CCD image sensor (hereunder referred to as a CCD) for reading image data from a draft picture optically and outputting an analog electric signal representing the read image data; 28 an analog-to-digital (A/D) converter for converting an analog voltage signal output from the CCD 27 to a digital signal; 29 a shading correction circuit for performing a shading correction on the digital signal; 30 a tone correction circuit for performing a tone correction an the signal according to a tone-correction rate preliminarily set by the CPU 21.

Hereinafter, an operation of the conventional image processing system having the above described configuration will be described by referring to FIGS. 40 and 41.

First, image data optically read by the CCD 27 and converted into an analog electric signal is further converted by the A/D converter 28 into an 8-bit (256-level) digital electric signal. Then, the digital electric signal undergoes a shading correction in the shading correction circuit 29. Subsequently, the tone correction circuit 30 performs a tone correction on the data represented by the signal corrected in the circuit 29 at the predetermined tone-correction rate. Next, the corrected data is written to the RAM 22. Then, the 8-bit image data stored in the RAM 22 is converted by the CPU 21 into binary image data (or halftone-dot image data) which is then displayed on the CRT display unit 25 and is also output to the printer 26.

The tone-correction rate can be determined as equal to a rate desired by an operator by setting a tone curve used for a tone correction. In the conventional image processing system, the read multi-level image data (namely, 8-bit (256-level) image data) respectively representing density-levels of all pixels of a draft picture (namely, an input image) are stored in the RAM. For example, the stored image data are accessed for inquiring into the densities of desired points of the input image displayed on the CRT display unit and into the distribution of densities (namely, tone-levels) represented by the image data. Namely, the stored image data are referred to for setting a tone curve for a tone correction.

The conventional image processing system, however, has a drawback in that a large number of bits are required for storing density data corresponding to each pixel and thus a storage device having a huge storage capacity is necessary. The present invention is created to eliminate such a drawback of the conventional system.

SUMMARY OF THE INVENTION

It is, accordingly, an object of the present invention to provide an image processing system which can easily obtain density data representing the density at each desired positions in (or of each desired pixel of) a multi-level draft (or input) image having three or more density-levels in order to modify a tone correction curve (hereunder sometimes referred to as a density correction curve), which represents the relation between input density data and output density data (namely, modified density data) and is necessary for performing a tone correction (hereunder sometimes referred to as a density correction) on image data read from the draft image by using a reading element such as a CCD capable of outputting a signal corresponding the density at each position of the draft image.

Further, it is another object of the present invention to provide an image processing system which can save storage elements (thus can save storage areas) by storing density data of suitably selected pixels of an input (or draft) image as data required for obtaining density data at desired positions in (or density data of desired pixels of) the input image, instead of storing density data of all pixels of the input image.

Moreover, it is a further object of the present invention to provide an image processing system which can select and store density data of pixels of an input image at a most suitable rate and thus have a most suitable storage capacity.

To achieve the foregoing object, in accordance with an aspect of the present invention, there is provided an image processing system, which comprises reading means for outputting multi-level image data corresponding to a density of each of pixels, to which an image of a draft is partitioned, sampling means for obtaining density data by sampling the image data output from the reading means at a predetermined rate of the number of the pixels, which correspond to image data to be sampled, to that of all of the pixels, storing means for storing the density data obtained by the sampling means, image processing means for performing a processing on the image data output from the reading means, displaying means for displaying an image represented by data obtained as a result of the processing by the image processing means, indicating means for indicating a position in the image displayed by the displaying means and control means for reading the density data corresponding to the position indicated by the indicating means from the storing means and making the displaying means display the read density data.

To achieve the foregoing object, in accordance with another aspect of the present invention, there is provided an image processing system, which comprises reading means for outputting multi-level image data corresponding to a density of each of pixels, to which an image of a draft is partitioned, sampling means for obtaining density data by sampling the image data output from the reading means at a predetermined rate of the number of the pixels, which correspond to image data to be sampled, to that of all of the pixels, storing means for storing the density data obtained by the sampling means, halftone-dot processing means for performing a halftone-dot processing, the halftone-dot processing means generating a halftone dot from each block composed of the pixels by assigning one of a plurality of binary density levels to a part of the pixels of each of the blocks to obtain a density to be represented by the corresponding block, displaying means for displaying an image represented by data obtained as a result of the processing by the halftone-dot processing means, indicating means for indicating a position in the image displayed by the displaying means and outputting information representing the indicated position and control means for making the displaying means display the data stored in the storing means according to the information representing the indicated position.

To achieve the foregoing object, in accordance with yet another aspect of the present invention, there is provided a method for performing an image processing, comprising the steps of partitioning an image of a draft into a plurality of pixels, reading multi-level image data corresponding to a density of each of the pixels, obtaining density data by sampling the image data at a predetermined rate of the number of the pixels, which correspond to image data to be sampled, to that of all of the pixels, storing the density data obtained by the sampling of the image data, displaying an image represented by the density data, specifying an indicated position in the displayed image and reading the density data corresponding to the specified position in the displayed image and displaying the read density data corresponding to the specified position.

To achieve the foregoing object, in accordance with still another aspect of the present invention, there is provided an image processing system, which comprises reading means for outputting multi-level digital image data corresponding to a density of each of pixels, to which an image of a draft is partitioned; sampling means for obtaining multi-level digital density data by sampling the multi-level image data output from the reading means at a predetermined rate of the number of the pixels, which correspond to multi-level image data to be sampled, to that of all of the pixels; storing means for storing the multi-level density data sampled by the sampling means; image processing means for generating a halftone-dot image by assigning one of binary density levels to each of the pixels having tone levels greater than a predetermined value corresponding to each cell of a halftone-dot pattern table, the tone level being represented by the multi-level density data corresponding to each of the pixels; displaying means for displaying the halftone-dot image obtained by the image processing means; indicating means for indicating a position in the halftone-dot image displayed by the displaying means; and control means for reading the density data corresponding to the position indicated by the indicating means from the storing means and making the displaying means display the read density data, wherein under the control of the control means, the display means displays a numerical value of a tone level represented by the read density data near the position in the halftone-dot image, which position is indicated by the indicating means.

To achieve the foregoing object, in accordance with another aspect of the present invention, there is provided an image processing system, which comprises: reading means for outputting multi-level digital image data corresponding to a density of each of pixels, to which an image of a draft is partitioned; sampling means for obtaining multi-level data digital density data by sampling the multi-level image data output from the reading means at a predetermined rate of the number of the pixels, which correspond to multi-level image data to be sampled, to that of all of the pixels; first storing means for storing the multi-level density data sampled by the sampling means; image processing means for generating a halftone-dot image by producing halftone dots from each block composed of the pixels, the image processing means assigning one of binary density levels to the pixels of each block, which have tone levels greater than a predetermined value corresponding to each cell of a halftone-dot pattern table, the tone level being represented by the multi-level density data corresponding to each pixel; second storing means for storing halftone-dot data corresponding to each of the produced halftone dots; displaying means for displaying the halftone-dot image represented by the halftone-dot data stored in the second storing means; indicating means for indicating a position in the halftone-dot image displayed by the displaying means; and control means for reading the density data corresponding to the position indicated by the indicating means from the first storing means and making the displaying means display the density data stored in the first storing means, wherein under the control of the control means, the display means displays a numerical value of a tone level represented by the read density data near the position in the halftone-dot image, which position is indicated by the indicating means.

To achieve the foregoing object, in accordance with yet another aspect of the present invention, there is provided a method for performing an image processing, which comprises the steps of: partitioning an image of a draft into a plurality of pixels; reading multi-level digital image data corresponding to a density of each of the pixels; obtaining multi-level digital density data by sampling the multi-level image data at a predetermined rate of the number of the pixels, which correspond to image data to be sampled to that of all of the pixels; storing the multi-level digital density data obtained by the sampling of the image data; displaying an image represented by the density data; specifying an indicated position in the displayed image; reading the density data corresponding to the specified position in the displayed image; and displaying the read density data near the specified position in the displayed image.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 21 is a graph for showing an example of the density correction curve employed in the second embodiment;

FIG. 22 is a diagram for illustrating a halftone-dot pattern table employed in the second embodiment;

FIG. 23 is a diagram for illustrating the relation between the half-dot pattern table and the pixels of the draft image, which is employed in the second embodiment;

FIGS. 26 and 27 are diagrams for illustrating the relation between a halftone-dot pattern table and a sampling period of time in case of the second embodiment;

DETAILED DESCRIPTION OF THE PREFERRED EMBODIMENTS

Hereinafter, preferred embodiments of the present invention will be described in detail by referring to the accompanying drawings.

I. FIRST EMBODIMENT

Figure 1:
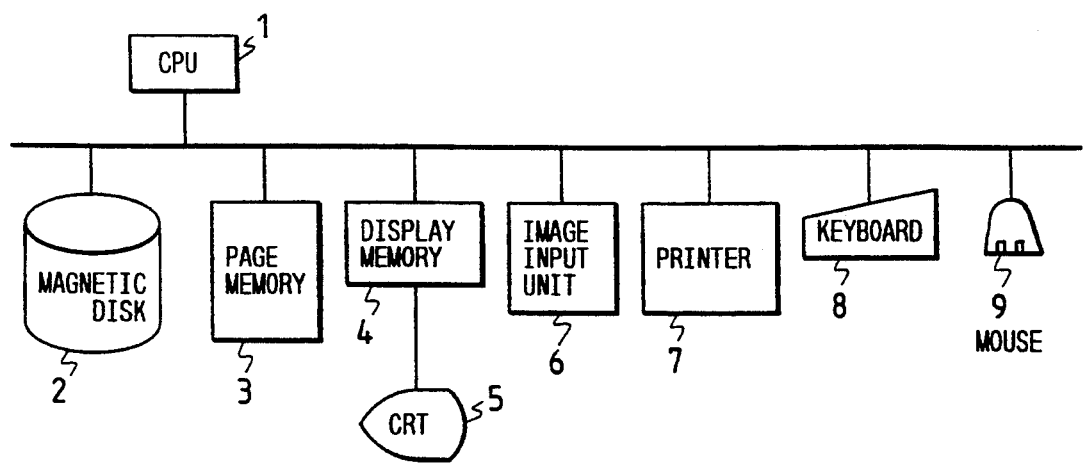
FIG. 1 is a schematic block diagram for illustrating the configuration of a first embodiment (namely, an image processing system embodying) the present invention.

FIG. 1 is a schematic block diagram for illustrating the configuration of a first embodiment of (namely, an image editing system embodying) the present invention. Reference numeral 1 designates a CPU for controlling the system and processing data; 2 a magnetic disk and drive unit (hereunder referred to simply as a magnetic disk) for storing programs and data; 3 what is called a page memory (hereunder sometimes referred to as an image memory); 4 a memory used for displaying a graph or the like (hereunder sometimes referred to as a display memory); 5 a CRT display unit (hereunder sometimes referred to simply as a CRT); 6 an image input unit; 7 a printer; 8 a keyboard; and 9 a mouse for indicating a position on a screen of the CRT 5.

Figure 2:
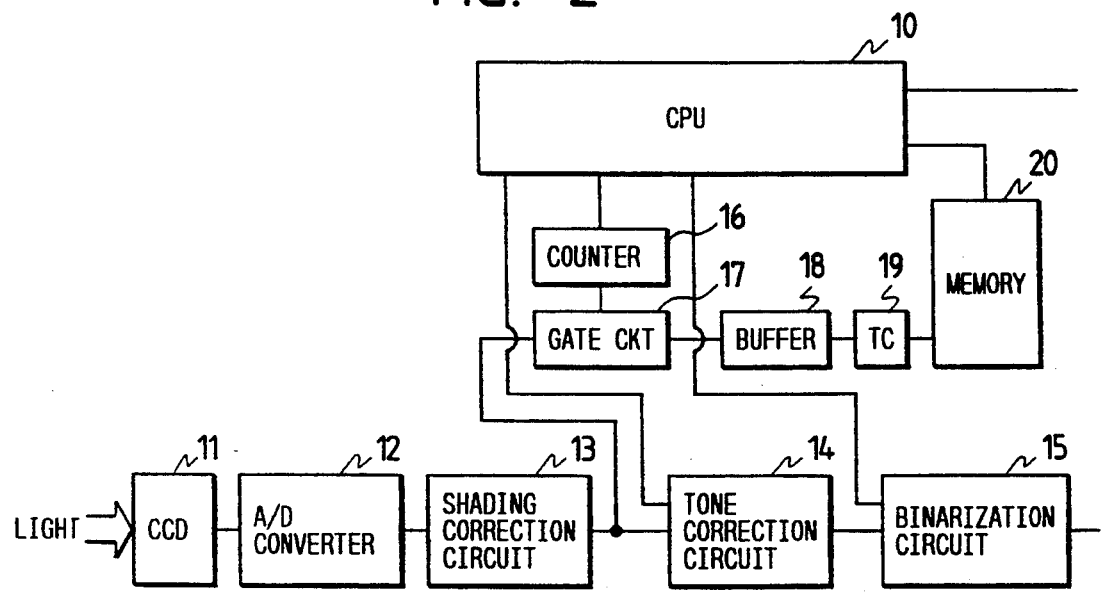
FIG. 2 is a schematic block diagram for illustrating the configuration of an image input unit of the first embodiment.

FIG. 2 is a schematic block diagram for illustrating the configuration of the image input unit 8 of the image editing system of FIG. 1. Reference numeral 10 denotes a CPU for controlling the image input unit 6; 11 an image sensor (hereunder referred to as a CCD) for outputting analog voltage signal in response to light incident thereto by converting the intensity of the incident light to the magnitude of a voltage (namely, the level of an analog voltage); 12 an A/D converter for converting an analog voltage signal output from the CCD 11 to an 8-bit digital voltage signal; 13 a shading correction circuit for correcting variation in the voltage signal due to a shading phenomenon occurring in a read or input image; 14 a tone correction circuit for performing a conversion of densities represented by input or read image data; 15 a binarization circuit for converting the 8-bit digital voltage signal into a binary data signal representing 0 or 1 by performing halftone-dot generation processing on the density data represented by the 8-bit digital voltage signal, which is corrected by the tone correction circuit 14; 16 a counter for repeatedly performing a process of counting a value set by the CPU 10 and outputting a positive signal of a period (hereunder sometimes referred to as a sampling period) corresponding to a pixel sampled when the counting of value is completed; 17 a gate circuit for selecting digital image data in response to the signal output from the counter 16; 18 a buffer for storing the image data of 1 line selected by the gate circuit 17; 20 a readable/writable memory for storing the image data temporarily held in the buffer 18; and 19 a transfer circuit for transferring the image data of 1 line temporarily stored in the buffer 18 to the memory 20 in response to a control signal output from the CPU 10.

Hereinafter, an image processing performed by the image editing system having the above described configuration will be described in detail.

1. READING OF IMAGE DATA

Figure 3:
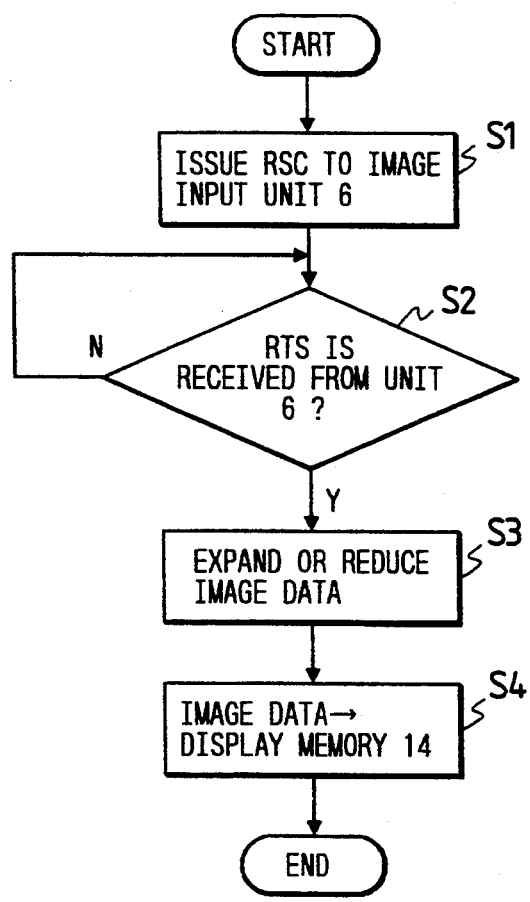
FIG. 3 is a flowchart for illustrating a control procedure performed by a CPU 1 of the first embodiment when reading image data from an input image.

First, as shown in the flowchart of FIG. 3, the CPU 1 of the system sends a signal representing conditions of a reading of image data for setting a tone curve, as well as a reading-operation starting command, to the CPU 10 of the image input unit 6 in step S1. Then, the image input unit 6 reads image data from an image and transfers the read image data to the image memory 3 sequentially. Thereafter, if the CPU 1 accepts a reading-operation terminating signal issued by the image input unit 6 in step S2, the CPU 101 expands or reduces the image data stored in the page memory 3 in accordance with the resolution of the CRT 5 in step S3. Subsequently, the expanded or reduced image data is written to the display memory 4 in step S4. The image data written to the display memory 4 is displayed in the CRT 5.

Thus, the read image data is converted into binary data (or halftone-dot image data), which is shown of the screen of the CRT 5. In addition, the read multi-level image data itself is sampled at a predetermined sampling rate and the sampled data is stored in the memory 20.

2. TONE CORRECTION

Figures 4, 5:
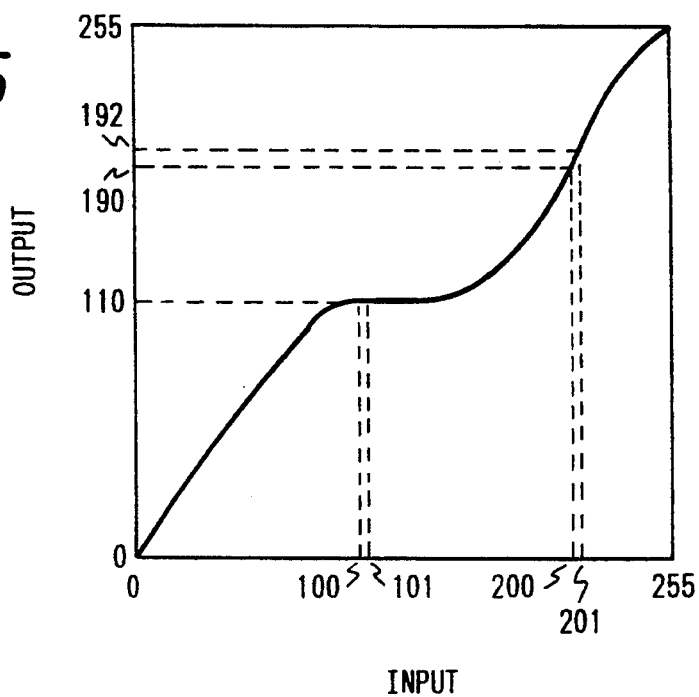
FIG. 4 is a diagram for illustrating how data representing a density correction curve is stored in the first embodiment.
FIG. 5 is a graph for showing an example of the density correction curve employed in the first embodiment.

In the tone correction circuit 14, a RAM having a storage area of 256 bytes as illustrated in FIG. 4 is provided. In the storage area of this RAM, tone levels (namely, density levels) represented by output image data, which would be obtained as a result of a tone correction, are set by the CPU 10 at locations thereof, the addresses of which respectively have values equal to tone levels represented by input image data, at the time of initialization of the RAM prior to the reading of the input image. Namely, predetermined relation between tone levels of output image data and tone levels of input image data (namely, the conversion relation) is initially established in the storage area of the RAM by the CPU 10. For instance, in case where the conversion relation represented by a tone curve of FIG. 5 is established therein, image data indicating a tone level of 110, which are stored at locations respectively having addresses of 100 and 101 of the RAM of FIG. 4, are output therefrom correspondingly to tone levels of 100 and 101 represented by input image data. Further, in such a case, image data respectively indicating tone levels of 190 and 192, which are stored at locations respectively having addresses of 200 and 201 of the RAM of FIG. 4, are output therefrom respectively corresponding to tone levels of 200 and 201 represented by the input image data. As described above, a tone correction is performed according to the established tone curve by fetching data stored at locations of the storage area of the RAM respectively corresponding to addresses, which are indicated by tone levels represented by the input image data, and then outputting the fetched data as the output image data.

3. SETTING OF TONE CURVE

In the magnetic disk 2, a storage area having the same structure as does the RAM of the tone correction circuit 14 is provided as illustrated in FIG. 4. Further, data representing an initial conversion relation indicated by the initial (tentative) tone curve is stored for displaying the tone curve in this storage area of the magnetic disk 2. The CPU 1 reads density data (hereunder sometimes referred to as initial value data), which is stored in the storage area of the magnetic disk 2 according to the relation indicated by the initial tone curve, therefrom. Then the CPU 1 generates data (hereunder sometimes referred to as display data) representing a graph of the initial tone curve, of which the horizontal axis denotes the density levels (namely, addresses in the storage area of the magnetic disk 2) represented by input image data and the vertical axis designates the density levels represented by output image data (stored at locations having the addresses in the storage area of the magnetic disk 2), according to the initial value data. Further, the generated display data is stored in the display memory 4. Subsequently, the initial tone curve for a tone correction as illustrated in FIG. 5 is displayed on the screen of the CRT 5 according to the display data. This tone curve is transformed into a desired curve by using the mouse 9 and executing a program employing known graphic processing techniques. Thereafter, the CPU 1 sends coordinate data representing coordinates of the modified tone curve to the CPU 10 of the image input unit 6. At that time, the coordinate data sent from the CPU 1 is set in the RAM of the tone correction circuit 14 by the CPU 10.

4. GENERATION OF BINARY IMAGE (OR HALFTONE-DOT IMAGE)

Figure 8:
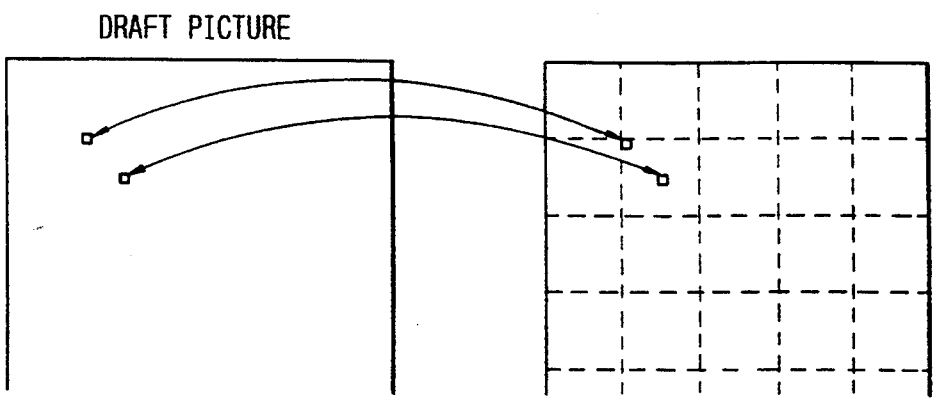
FIG. 8 is a diagram for illustrating the relation between the half-dot pattern table and the pixels of the draft image, which is employed in the first embodiment.

The binarization circuit 15 converts the multi-level image data corrected by the tone correction circuit 14 into binary image data (or halftone-dot image data). In this circuit, the density (namely, the tone level) represented by the density data of each pixel output from the tone correction circuit 14 is compared with the value set at a corresponding cell of the halftone-dot pattern table of FIG. 6 established therein. If the tone level of a pixel is larger than the value set at the corresponding cell of the table, the color of the pixel is determined as black (corresponding to a value of 1). Conversely, if the tone level of a pixel is smaller than the value set at the corresponding cell of the table, the color of the pixel is determined as white (corresponding to a value of 0). The same halftone-dot pattern table is repeatedly used to be compared with image data of pixels of the same number as of cells thereof. FIG. 8 illustrates the relation between each pixel of the input image and a corresponding cell of the halftone-dot pattern table diagramatically. As is apparent from this figure, each pixel of the input image is in one-to-one correspondence relation with a cell of the halftone-dot pattern table.

Thus, to generate a halftone-dot image, halftone is approximately represented by regulating a rate of an area of black pixels to a unit area (namely, the size of the halftone-dot pattern table). Therefore, if a halftone-dot pattern table of a large size (namely, a halftone-dot pattern table having a large number of cells) is employed, an image, each of pixel which has many tone-levels, can be represented. In contrast, if a halftone-dot pattern table of a small size (namely, a halftone-dot pattern table having a small number of cells) is employed, only an image, each of pixel which has a small number of tone-levels, can be represented. Practically, the binarization circuit 15 has the halftone-dot pattern tables of various sizes. Thus a desired one of the tables can be used according to an indication from the CPUs 1 and 10 based on a direction from an operator.

Figure 9:
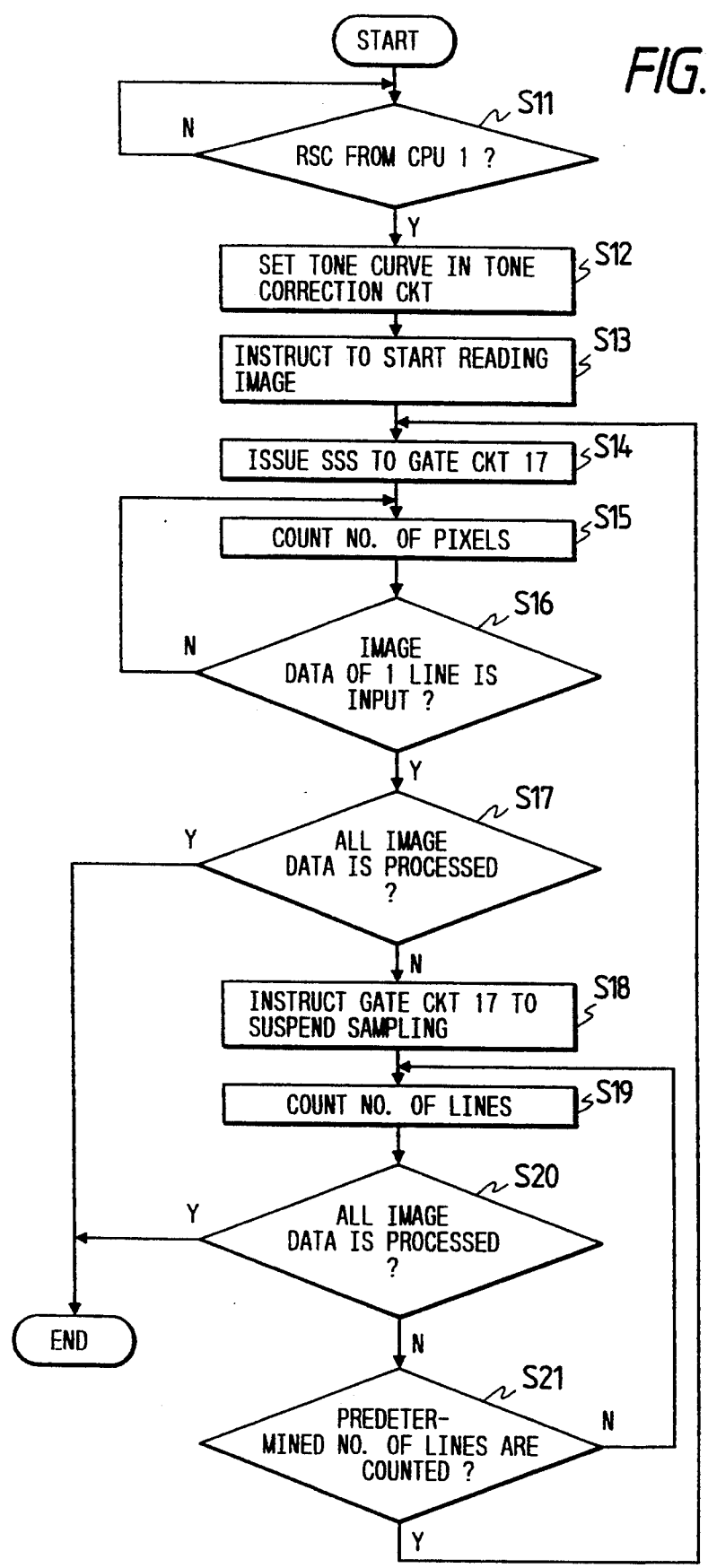
FIG. 9 is a flowchart for illustrating a control procedure performed by a CPU 10 of the first embodiment when reading image data from an input image.

On the other hand, if the CPU 10 of the image input unit 6 receives a reading-operation starting command from the CPU 1 in step S11 as illustrated in FIG. 9, the CPU 10 sets a tone curve in the tone correction circuit 14 in step S12. Further, the CPU 10 starts an operation of reading a draft image in step S13. Then, the CPU 10 issues a sampling-operation starting signal to the gate circuit 17. When starting the operation of reading the draft picture, the draft picture is irradiated and thereafter light reflected by the draft picture focuses into an image on the CCD 11. This light is converted by the CCD 11 into an electric signal. Subsequently, the electric signal is further converted by the A/D converter 12 into an 8-bit digital signal. Thereafter, the shading correction circuit 13 performs a shading correction on the 8-bit digital signal. Further, the 8-bit image data obtained as a result of the shading correction is input to both of the tone correction circuit 14 and the gate circuit 17.

Figures 6, 7:
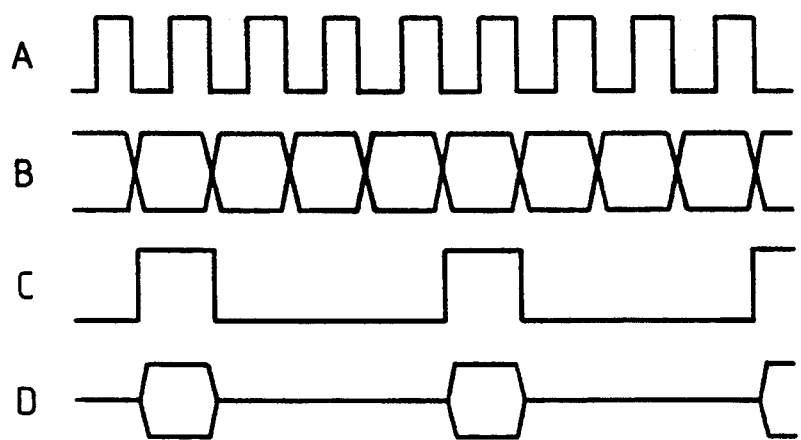
FIG. 6 is a diagram for illustrating a halftone-dot pattern table employed in the first embodiment.
FIG. 7 is a timing chart for illustrating an operation of "extracting" or sampling density data in case of the first embodiment.

As is shown in FIG. 7, the counter 16 outputs a signal C to the gate circuit 17 each time when counting a value set by the CPU 10, in synchronization with an outputting of the image data from the shading correction circuit 13 (see a fundamental clock A and a digital image signal B). The gate circuit 17 is enabled in response to the signal output from the counter 16 and samples the image data output from the shading correction circuit 13 at a sampling rate and writes an output signal D representing the sampled data to the memory 20 through the buffer 18 and the transfer circuit 19. At that time, the CPU 10 counts the pixels of the image represented by the image data input to the gate circuit 17 in step S15. If the CPU 10 judges in step S16 that the image data of 1 line is input thereto, and further judges in step S17 that not all of the image data has been processed, the CPU 10 instructs the gate circuit 17 to suspend the sampling. In response to such an instruction from the CPU 10, the gate circuit 17 suspends the sampling of the image data to be written to the memory 20.

Even when the gate circuit 17 suspends the sampling of the image data, the CPU 10 counts the image data of each line by counting the pixels of the image data input to the circuit 17 in step S19 similarly as in steps S15 and S16. Subsequently, if the CPU 10 judges in step S20 that not all of the image data have not been processed, and further judges in step S21 that the processing of the image data of a predetermined number of lines stored in the counter 16 has been finished, the control procedure returns to step S14, whereupon the CPU 10 issues a sampling-operation starting signal to the gate circuit 17. As a result, with regard to a block of the input image data, on which a binarization is performed (namely, from which halftone-dot image data (or binary image data) is generated), the density data of each pixel thereof is "extracted" (or sampled) and stored in the memory 20.

5. DISPLAYING OF DENSITY

Figure 12:
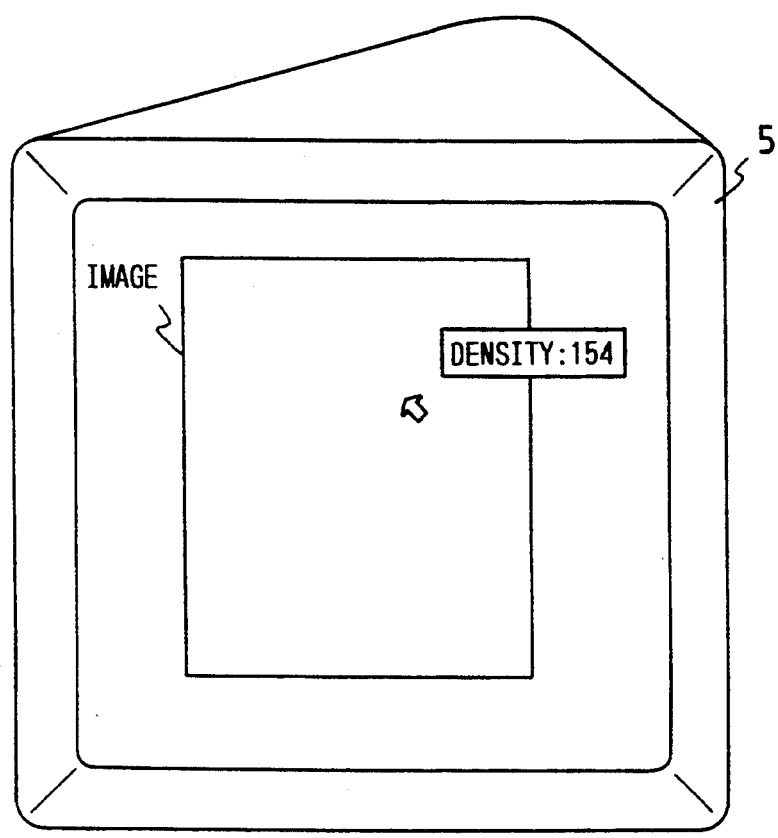
FIG. 12 is a diagram for illustrating how density data is displayed on a display unit.
Figure 10:
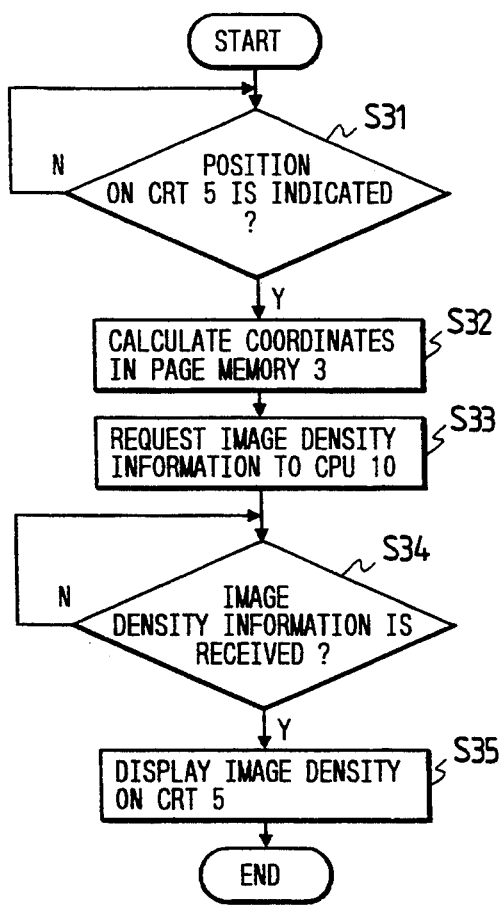
FIG. 10 is a flowchart for illustrating a control procedure performed by the CPU 1 of the first embodiment when effecting an operation of displaying density data.
Figure 11:
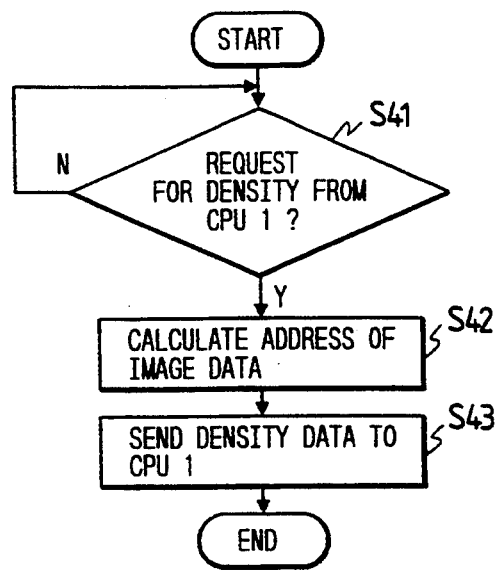
FIG. 11 is a flowchart for illustrating a control procedure performed by the CPU 10 of the first embodiment when effecting an operation of displaying density data.

An operation of displaying density data is controlled by the CPUs 1 and 10 in accordance with the flowcharts of FIGS. 10 and 11. First, if a position in an image displayed on the screen of the CRT 5 is indicated by using the mouse 9 in step S31, the CPU 1 calculates an address in the page memory 3 (corresponding to coordinates in the read draft picture) from the indicated position or coordinates on the screen of the CRT 5 in step S32. Then, in step S33, the CPU 1 issues the CPU 10 of the image input unit 6 with signals representing the calculated coordinates and a command requesting the density level corresponding to the calculated coordinates. Thereafter, if the CPU 1 receives image density information from the image input unit 6 in step S34, the density represented by the received information is displayed in step S35 in the vicinity of a position, which is indicated by a cursor, on the screen of the CRT 5 as illustrated in FIG. 12.

On the other hand, as illustrated in FIG. 11, if the CPU 10 accepts information representing the calculated coordinates and the command requesting the corresponding density from the CPU 1 in step S41, the CPU 10 computes an address of the memory 20, at which the sampled corresponding image data are stored, from the coordinates received from the CPU 1 in step S42 and subsequently, in step S43, the CPU 10 outputs the density data stored at the address to the CPU 1.

6. THE RELATION BETWEEN THE SIZE OF THE HALFTONE-DOT PATTERN TABLE AND A SAMPLING PERIOD

Figure 13:
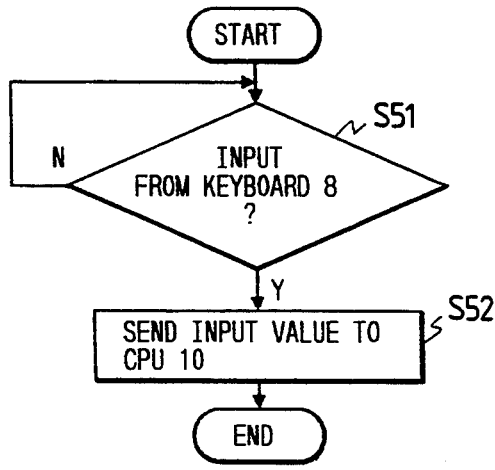
FIG. 13 is a flowchart for illustrating a control procedure performed by the CPU 1 of the first embodiment when setting a sampling period of time.
Figure 14:
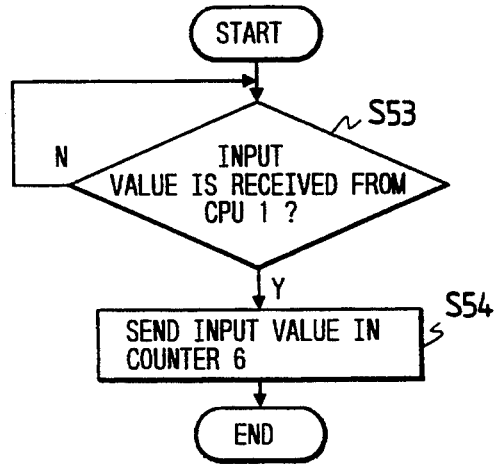
FIG. 14 is a flowchart for illustrating a control procedure performed by the CPU 10 of the first embodiment when setting a sampling period of time.

Referring now to the control procedures of FIGS. 13 and 14, the CPU 1 receives data representing the size of the halftone-dot pattern table input from the keyboard 8 in step S31, the CPU 1 sends the received data representing the input size to the CPU 10 of the image input unit 6. On the other hand, if the CPU 10 receives the data indicating the size of the halftone-dot pattern table from the CPU 1 in step S53, the CPU 10 establishes the received value of the size of the table in the counter 16 in step S54. As described above, the counter 16 outputs the signal C each time when counting the value established by the CPU (namely, in this case, the value of the size of the halftone-dot pattern table) therein. The gate circuit 17 is enabled in response to the signal C and samples the image data. Therefore, the number of pixels (namely, the number of density data to be stored) corresponding to the sampling period is set as equal to the size (namely, the number of unit blocks to be converted to halftone dots) of the halftone-dot pattern table.

Generally, in case where a halftone image is represented by a binary output device, halftone is approximately represented by effecting a halftone-dot generation processing similarly as in case of this embodiment. Namely, halftone is approximately represented by regulating a rate of an area of black pixels to a unit block or area composed of a plurality of pixels. Thus, the density of a position in an image is represented by using a block of a predetermined size. Therefore, in case where the density at a position in a halftone-dot image is obtained by indicating the position in the halftone-dot image and then reading the multi-level density data stored in a memory, it is of no significance to store plural multi-level data correspondingly to a unit block.

The data output to the CRT 5 and the printer 7 is halftone-dot image data. It is, therefore, necessary and sufficient for knowing the density at a desired position in a displayed image to set the number of pixels (or density data) corresponding to a sampling period as equal to the size of the halftone-dot pattern table and to store a multi-level image data correspondingly to each unit block to be converted into a halftone dot. Namely, it is necessary and sufficient for knowing the density at a desired position in a draft image to set the number of the blocks as equal to the number of the density data to be sampled and stored.

As stated above, in case of the first embodiment, a read multi-level image data is converted to binary image: data and the binary image data is stored in the image memory. Moreover, the read image data itself is sampled and the sampled data is stored in the memory. Thus, the necessary memory capacity can be reduced or saved. Further, the density at a position in the read image can easily be known and provided as reference data for setting a tone curve for a tone correction.

Furthermore, in case of the first embodiment, the number of the pixels (or the blocks) composing the halftone-dot pattern table is set as equal to that of the density data corresponding to the sampling period. Thus, the multi-level data of the pixels of a number, which is most suitable for knowing the density at a desired position in the read image, can be sampled.

Incidentally, the sampled multi-level image data is stored in the first embodiment. Thus, a roughly estimated distribution of densities of a draft picture can be obtained and also used as effective reference data for setting a tone curve for a tone correction.

Additionally, the first embodiment is adapted to determine the sampling period by indicating the size of the halftone-dot pattern table. However, the same effects can be obtained if the first embodiment is adapted to determine the size of the halftone-dot pattern table from the sampling period.

II. SECOND EMBODIMENT

Figure 15:
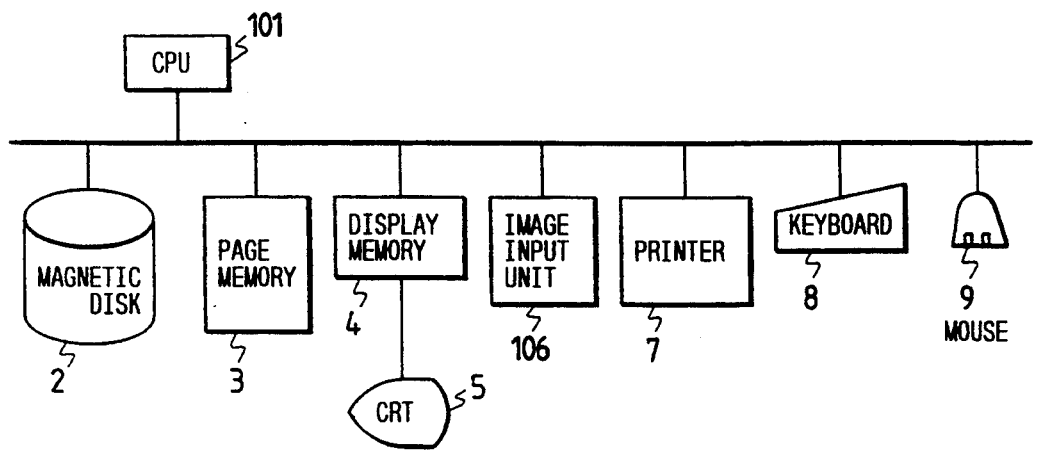
FIG. 15 is a schematic block diagram for illustrating the configuration of a second embodiment (namely, an image processing system embodying) the present invention.

FIG. 15 is a schematic block diagram for illustrating the configuration of a second embodiment of (namely, another image editing system embodying) the present invention. Reference numeral 101 designates a CPU for controlling the system and processing data; and 106 an image input unit. As is apparent from a comparison between FIGS. 1 and 15, the configuration of the second embodiment is similar to that of the first embodiment except the CPU 101 and the image input unit 106.

Figure 16:
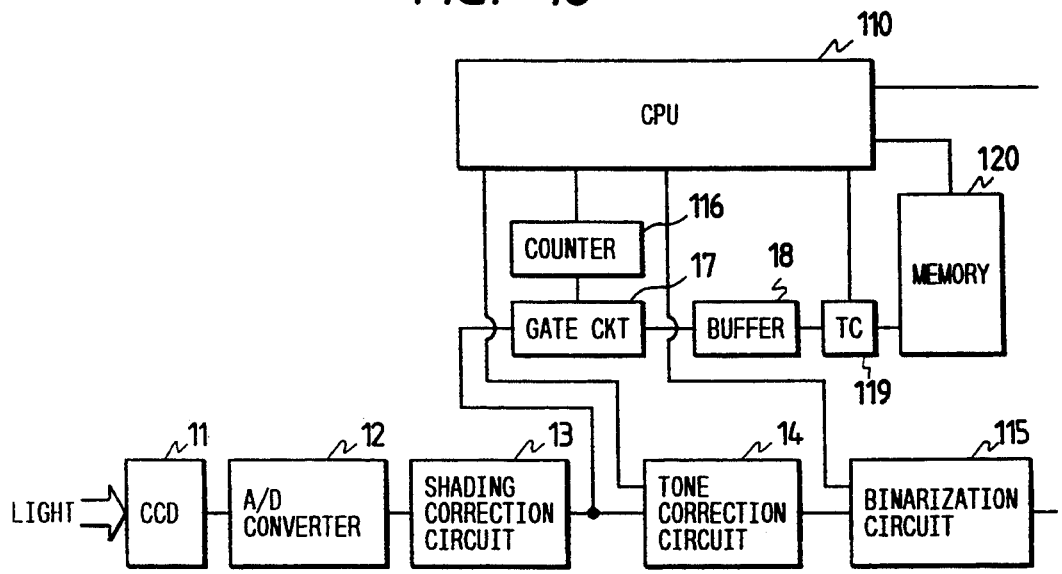
FIG. 16 is a schematic block diagram for illustrating the configuration of an image input unit of the second embodiment.

FIG. 16 is a schematic block diagram for illustrating the configuration of the image input unit 106 of FIG. 15. Reference numeral 110 denotes a CPU for controlling the image input unit 106; 115 a binarization circuit for converting the 8-bit digital signal into a binary data signal representing 0 or 1 by performing a halftone-dot generation processing on the density data represented by the 8-bit digital signal, which is corrected by the tone correction circuit 14; 116 a counter for repeatedly performing a process of counting a preset value "4" and outputting a positive signal of a period corresponding to a pixel sampled when the counting of the value is completed; and 119 a transfer circuit for transferring the image data of 1 line temporarily stored in the buffer 18 to the memory 120 in response to a control signal output from the CPU 110.

Hereinafter, an image processing performed by the image editing system (namely, the second embodiment) having the above described configuration will be described in detail.

1. READING OF IMAGE DATA

Figure 17:
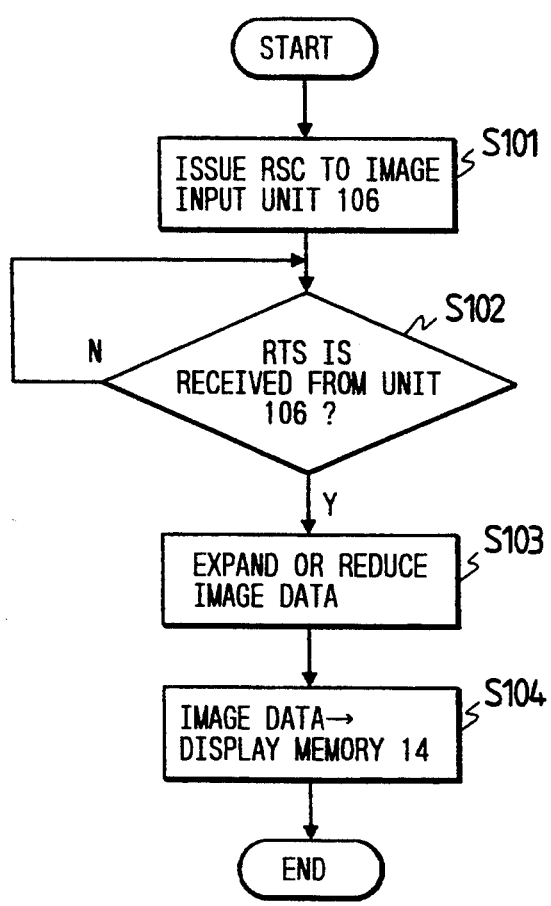
FIG. 17 is a flowchart for illustrating a control procedure performed by a CPU 101 of the second embodiment when reading image data from an input image.

First, as shown in the flowchart of FIG. 17, the CPU 101 of the system sends a signal representing conditions of a reading of image data for setting a tone curve, as well as a reading-operation starting command, to the CPU 110 of the image input unit 106 in step S101. Then, the image input unit 106 reads image data from an image and transfers the read image data to the image memory 3 sequentially. Thereafter, if the CPU 101 accepts a reading-operation terminating signal issued by the image input unit 106 in step S102, the CPU 101 expands or reduces the image data stored in the page memory 3 in accordance with the resolution of the CRT 5 in step S103. Subsequently, the expanded or reduced image data is written to the display memory 4 in step S104. The image data written to the display memory 4 is displayed in the CRT 5.

Figure 18:
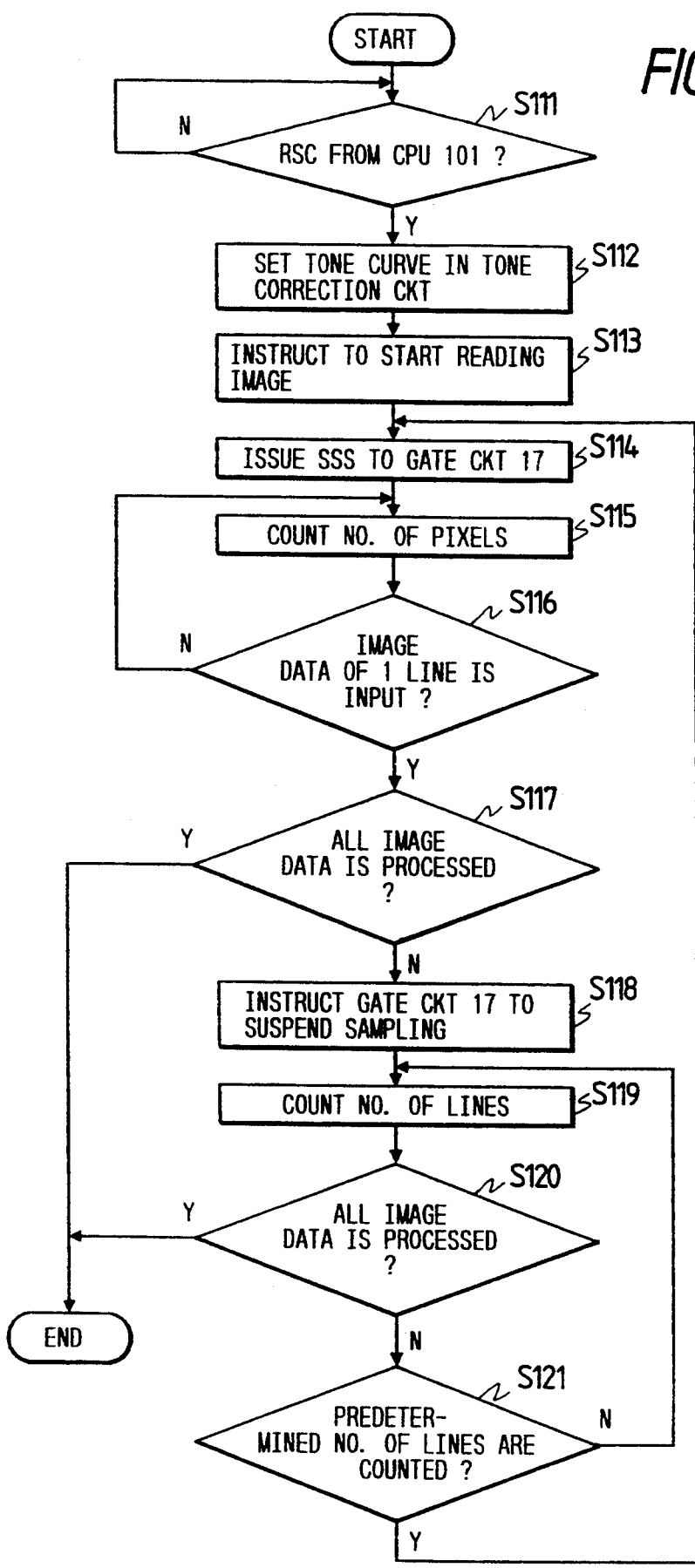
FIG. 18 is a flowchart for illustrating a control procedure performed by a CPU 110 of the second embodiment when reading image data from an input image.

On the other hand, if the CPU 110 of the image input unit 106 receives a reading-operation starting command from the CPU 101 in step Sill as illustrated in FIG. 18, the CPU 110 sets a tone curve in the tone correction circuit 14 in step S112. Further, the CPU 110 starts an operation of reading a draft image in step S113. Then, the CPU 110 issues a sampling-operation starting signal to the gate circuit 17. When starting the operation of reading the dragt picture, the draft picture is irradiated and thereafter light reflected by the draft picture focuses into an image on the CCD 11. This light is converted by the CCD 11 into an electric signal. Subsequently, the electric signal is further converted by the A/D converter 12 into an 8-bit digital signal. Thereafter, the shading correction circuit 13 performs a shading correction on the 8-bit digtal signal. Further, the 8-bit image data obtained as a result of the shading correction is input to both of the tone correction circuit 14 and the gate circuit 17.

Figures 19, 20:
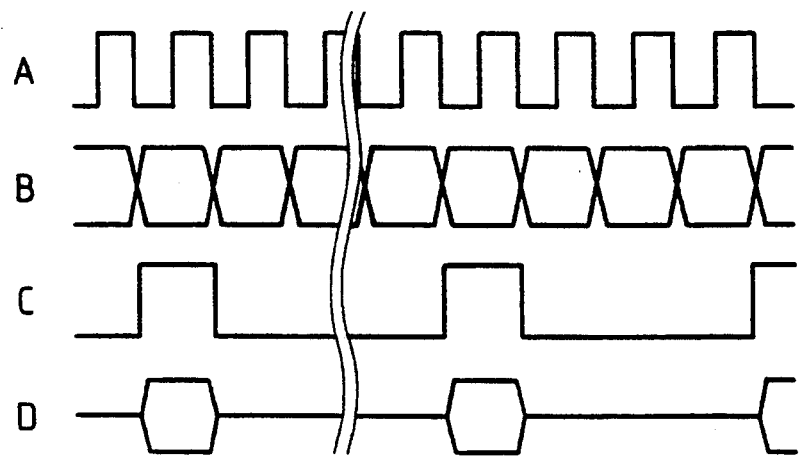
FIG. 19 is a timing chart for illustrating an operation of "extracting" or sampling density data in case of the second embodiment.
FIG. 20 is a diagram for illustrating how data representing a density correction curve is stored in the second embodiment.

As is shown in FIG. 19, the counter 116 outputs a signal C to the gate circuit 17 each time when counting "4" preset by the CPU 110, in synchronization with an outputting of the image data from the shading correction circuit 13 (see a fundamental clock A and a digital image signal B). The gate circuit 17 is enabled in response to the signal output from the counter 116 and samples the image data output from the shading correction circuit 13 at a sampling rate and writes an output signal D representing the sampled data to the memory 120 through the buffer 18 and the transfer circuit 119. At that time, the CPU 110 counts the pixels of the image represented by the image data input to the gate circuit 17 in step S115. If the CPU 110 judges in step S116 that the image data of 1 line is input therto, and further judges in step S117 that not all of the image data has been processed, the CPU 110 instructs the gate circuit 17 to suspend the sampling. In response to such sn instruction from the CPU 110, the gate circuit 17 suspends the sampling of the image data to be written to the memory 120.

Even when the gate circuit 17 suspends the sampling of the image data, the CPU 110 counts the image data of each line by counting the pixels of the image data input to the circuit 17 in step S119 similarly as in steps S115 and S116. Subsequently, if the CPU 110 judges in step S120 that riot all of the image data have not been processed, and further judges in step S121 that the processing of the image data of a predetermined number of lines stored in the counter 106 has been finished, the control procedure returns to step S114, whereupon the CPU 110 issues a sampling-operation starting signal to the gate circuit 17. Thus, the read image is converted into the binary image, which is displayed on the screen of the CRT 5, and the read multi-level image data is sampled at a predetermined rate and the sampled image data is stored in the memory 120.

2. TONE CORRECTION

In the tone correction circuit 14, a RAM having a storage area of 256 bytes as illustrated in FIG. 20 is provided. In the storage area of this RAM, tone levels (namely, density levels) represented by output image data, which would be obtained as a result of a tone correction, are set by the CPU 110 at locations thereof, the addresses of which respectively have values equal to tone levels represented by input image data, at the time of initialization of the RAM prior to the reading of the input image. Namely, predetermined relation between tone levels of output image data and tone levels of input image data (namely, the conversion relation) is initially established in the storage area of the RAM by the CPU 110. For instance, in case where the conversion relation represented by a tone curve of FIG. 21 is established therein, image data indicating a tone level of 110, which are stored at locations respectively having addresses of 100 and 101 of the RAM of FIG. 20, are output therefrom correspondingly to tone levels of 100 and 101 represented by input image data. Further, in such a case, image data respectively indicating tone levels of 190 and 192, which are stored at locations respectively having addresses of 200 and 201 of the RAM of FIG. 20, are output therefrom respectively corresponding to tone levels of 200 and 201 represented by the input image data. As described above, a tone correction is performed according to the established tone curve by fetching data stored at locations of the storage area of the RAM respectively corresponding to addresses, which are indicated by tone levels represented by the input image data, and then outputting the fetched data as the output image data.

3. SETTING OF TONE CURVE

In the magnetic disk 2, a storage area having the same structure as the RAM of the tone correction circuit 14 does as illustrated in FIG. 20 is provided. Further, data representing an initial conversion relation indicated by the initial (tentative) tone curve is stored for displaying the tone curve in this storage area of the magnetic disk 2. The CPU 101 reads density data (namely, initial value data), which is stored in the storage area of the magnetic disk 2 according to the relation indicated by the initial tone curve, therefrom. Then the CPU 101 generates data (hereunder sometimes referred to as display data) representing a graph of the initial tone curve, of which the horizontal axis denotes the density levels (namely, addresses in the storage area of the magnetic disk 2) represented by input image data and the vertical axis designates the those represented by output image data (stored at locations having the addresses in the storage area of the magnetic disk 2), according to the initial value data. Further, the generated display data is stored in the display memory 4. Subsequently, the initial tone curve for a tone correction as illustrated in FIG. 21 is displayed on the screen of the CRT 5 according to the display data. This tone curve is transformed into a desired curve by using the mouse 9 and executing a program employing known graphic processing techniques. Thereafter, the CPU 101 sends coordinate data representing coordinates of the modified tone curve to the CPU 110 of the image input unit 106. At that time, the coordinate data sent from the CPU 101 is set in the RAM of the tone correction circuit 14 by the CPU 110.

4. GENERATION OF BINARY IMAGE (OR HALFTONE-DOT IMAGE)

The binarization circuit 15 converts the multi-level image data corrected by the tone correcton circuit 14 into binary image data (or halftone-dot image data). In this circuit, the density (namely, the tone level) represented by the density data of each pixel output from the tone correction circuit 14 is compared with the value set at a corresponding cell of the halftone-dot pattern table of FIG. 22 established therein. If the tone level of a pixel is larger than the value set at the corresponding cell of the table, the color of the pixel is determined as black (corresponding to a value of 1). Conversely, if the tone level of a pixel is smaller than the value set at the corresponding cell of the table, the color of the pixel is determined as white (corresponding to a value of 0). The same halftone-dot pattern table is repeatedly used to be compared with image data of pixels of the same number as of cells thereof. FIG. 23 illustrates the relation between each pixel of the input image and a corresponding cell of the halftone-dot pattern table diagramatically. As is apparent from this figure, each pixel of the input image is in one-to-one correspondence relation with a cell of the halftone-dot pattern table.

The binarization circuit 115 has 33 kinds of halftone-dot pattern tables, the size of which ranges from $4 \times 4$ to $36 \times 36$. Further, a desired one of the tables can thus be used according to an indication from the CPUs 101 and 110 based on a direction input from the keyboard 8 by an operator.

5. DISPLAYING OF DENSITY

Figure 24:
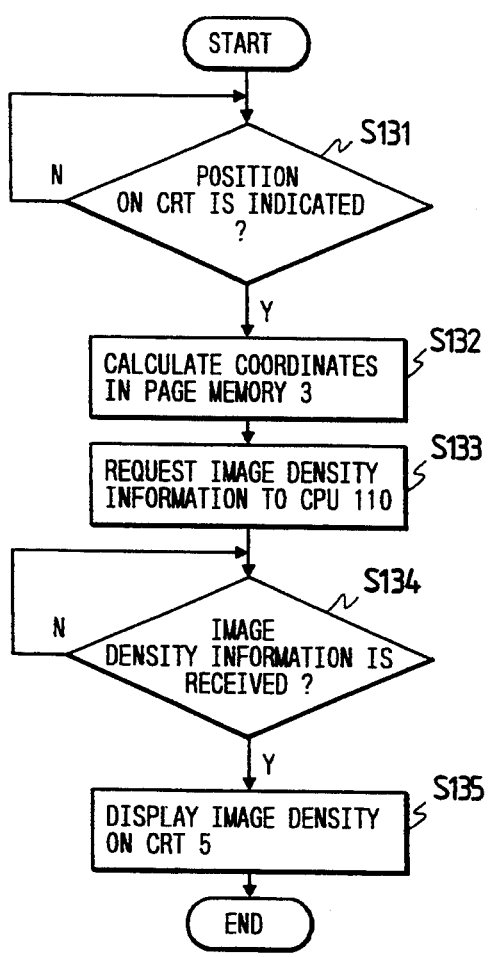
FIG. 24 is a flowchart for illustrating a control procedure performed by the CPU 101 of the second embodiment when effecting an operation of displaying density data.
Figure 25:
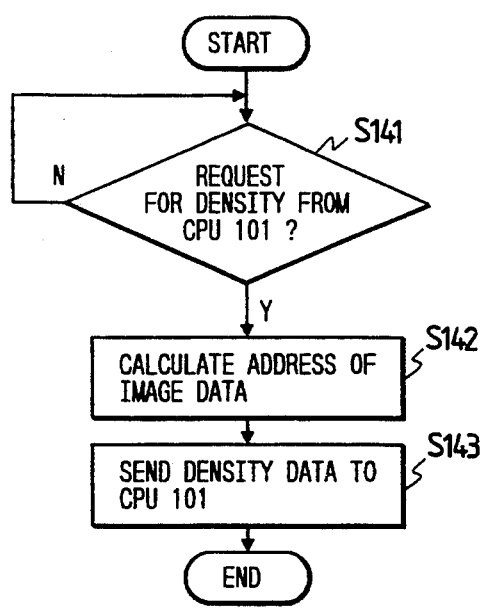
FIG. 25 is a flowchart for illustrating a control procedure performed by the CPU 110 of the second embodiment when effecting an operation of displaying density data.

An operation of displaying density data is controlled by the CPUs 101 and 110 in accordance with the flowcharts of FIGS. 24 and 25. First, if a position in an image displayed on the screen of the CRT 5 is indicated by using the mouse 9 in step S131, the CPU 101 calculates an address in the page memory 3 (corresponding to coordinates in the read draft picture) from the indicated position or coordinates on the screen of the CRT 5 in step S132. Then, in step 133, the CPU 101 issues the CPU 110 of the image input unit 106 with singals representing the calculated coordinates and a command requesting the density level corresponding to the calculated coordinates. Thereafter, if the CPU 101 receives image density information from the image input unit 106 in step S134, the density represented by the received information is displayed in step S135 in the vicinity of a position, which is indicated by a cursor, on the screen of the CRT 5 as illustrated in FIG. 12.

On the other hand, if the CPU 110 accepts information representing the calculated coordinates and the command requesting the corresponding density from the CPU 101 in step S141, the CPU 110 computes an address of the memory 120, at which the sampled corresponding image data are stored, from the coordinates received from the CPU 101 in step S142 and subsequently, in step S143, the CPU 110 outputs the density data stored at the address to the CPU 101.

6. THE RELATION BETWEEN THE SIZE OF THE HALFTONE-DOT PATTERN TABLE AND A SAMPLING PERIOD

As described above, generally, in case where a halftone image is represented by a binary output device. halftone is approximately represented by effecting a halftone-dot generation processing similarly as in case of this embodiment. Namely, halftone is approximately represented by regulating a rate of an area of black pixels to a unit block or area composed of a plurality of pixels. Thus, the density of a position in an image is represented by using a block of a predetermined size. Therefore, in case where the density at a position in a halftone-dot image is obtained by indicating the position in the halftone-dot image and then reading the multi-level density data stored in a memory, it is preferable to store at least a multi-level data correspondingly to a unit block.

That such a relation holds good is necessary and sufficient for obtaining information on the density at a desired position in a displayed halftone-dot image, watching the halftone-dot image, if the number of blocks converted by the binarization circuit 15 into dots is equal to that pixels corresponding to the sampled image data in case where change in density represented by draft image data is gentle as illustrated in FIG. 26. However, in a portion, in which change in density is radical as illustrated in FIG. 27, such as a line drawing or a contour of an image, there occurs a bias to black or white pixels in a unit block converted into a halftone dot. Thus, if only the density data of a is stored for such a unit block converted into a halftone dot, information on the density, which is entirely different from an actual or true appearance of such a unit block of may be obtained in case that a displayed image is observed and a position in the displayed image is indicated. For example, in case of the picture of FIG. 27, if the multi-level data, which indicates the density or tone-level of 230, of the pixel (a, 1) is sampled for a whitish unit block, only irrelevant density information is obtained then a position (d, 1) is indicated.

In view of this problem and a limit to a memory capacity, it is necessary for obtaining relevant density information to set a sampling period as equal to the minimum size of the halftone-dot pattern table similary as in case of the second embodiment and sample a plurality of multi-level data correspondingly to a unit block to be converted into a halftone dot.

As stated above, in case of the second embodiment, a read multi-lefvel image data is converted to binary image data and the binary image data is stored in the image memory.

Moreover, the read image data itself is sampled and the sampled data is stored in the memory. Thus, the necessary memory capacity can be reduced or saved. Further, the density at a position in the read image can easily be known and provided as reference data for setting a tone curve for a tone correction.

Furthermore, in case of the second embodiment, the number of the pixels, the corresponding density data of which should be sampled, is set as equal to or more than that of blocks converted into halftone dots. Thus, the multi-level data can be sampled by using only the minimum memory capacity required for obtaining image density information. In case of the second embodiment, the memory capacity required for obtaining image density information is $1/(4 \times 4) = 1/16$ times that required in case of storing all of the multi-level data of the entire draft picture.

Incidentally, the sampled multi-level image data is stored in the first embodiment. Thus, a roughly estimated distribution of densities of a draft picture can be obtained and also used as effective reference data for setting a tone curve for a tone correction.

Additionally, in case of the second embodiment, a read multi-level image data is converted to binary image data and the binary image data is stored in the image memory. Moreover, the read image data itself is sampled at a sampling rate larger than a rate of the number of halftone dots to the number of all of the pixels, and the sampled data is stored in the memory. Thus, the necessary memory capacity can be reduced or saved. Further, the density at a position in the read image can easily be known and provided as reference data for setting a tone curve for a tone correction.

III. THIRD EMBODIMENT

Figure 28:
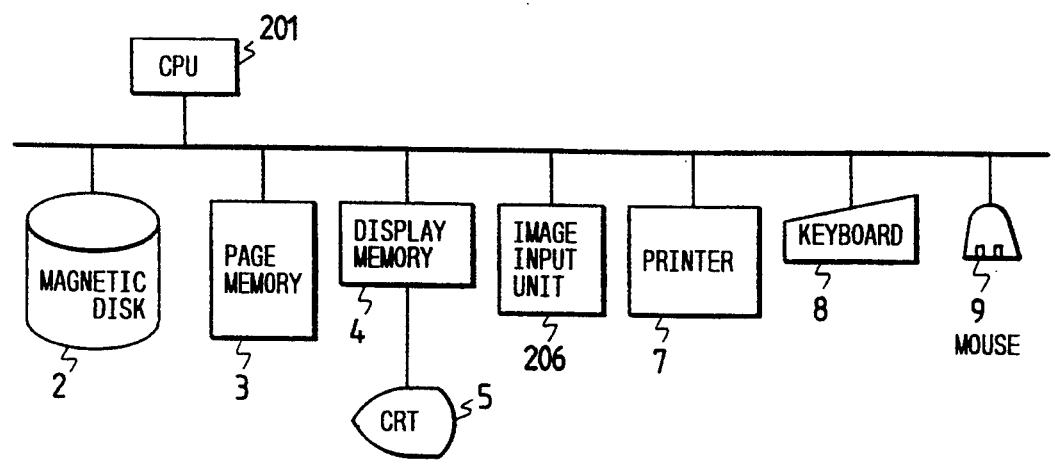
FIG. 28 is a schematic block diagram for illustrating the configuration of a third embodiment (namely, an image processing system embodying) the present invention.

FIG. 28 is a schematic block diagram for illustrating the configuration of a third embodiment of (namely, a further image editing system embodying) the present invention. Reference numeral 201 designates a CPU for controlling the system and processing data; and 206 an image input unit. As is apparent from a comparison between FIGS. 1 and 28, the configuration of the third embodiment is similar to that of the first embodiment except the CPU 201 and the image input unit 206.

Figure 29:
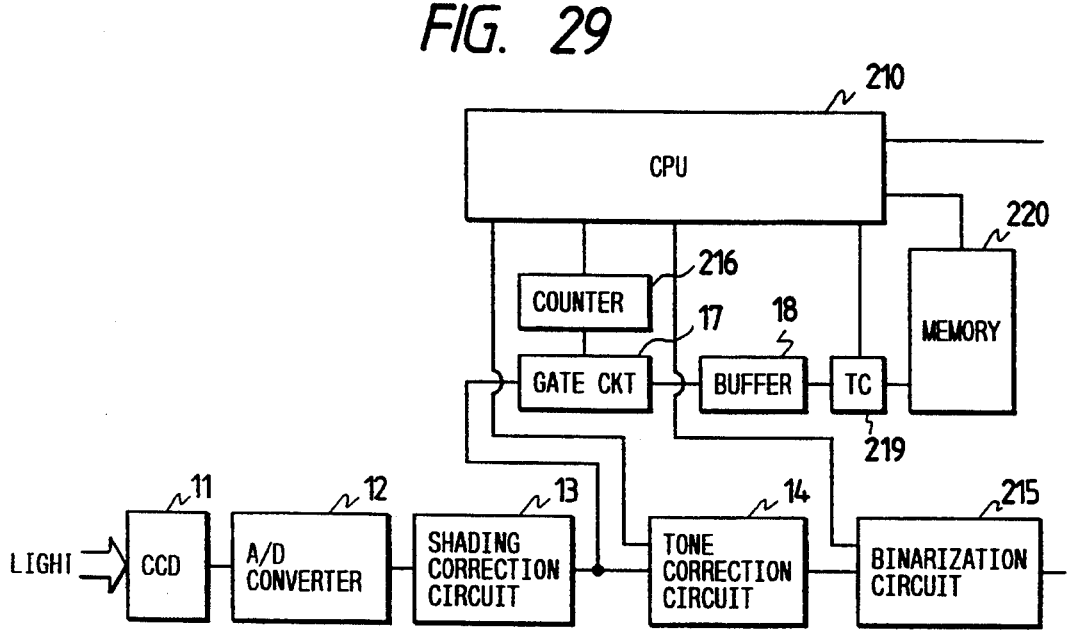
FIG. 29 is a schematic block diagram for illustrating the configuration of an image input unit of the third embodiment.

FIG. 29 is a schematic block diagram for illustrating the configuration of the image input unit 206 of FIG. 28. Reference numeral 210 denotes a CPU for controlling the image input unit 206; 215 a binarization circuit for converting the 8-bit digital signal into a binary data signal representing 0 or 1 by performing a halftone-dot generation processing on the density data represented by the 8-bit digital signal, which is corrected by the tone correction circuit 14; 216 a counter for repeatedly performing a process of counting a preset value "36" and outputting a positive signal of a period corresponding to a pixel sampled when the counting of the value is completed; 220 a readable/writable memory for storing the image data selected by the gate circuit 17 and temporarily held in the buffer 18; and 119 a transfer circuit for transferring the image data of 1 line temporarily stored in the buffer 18 to the memory 120 in response to a control signal output from the CPU 210.

Hereinafter, an image processing performed by the image editing system (namely, the third embodiment) having the above described configuration will be described in detail.

1. READING OF IMAGE DATA

Figure 30:
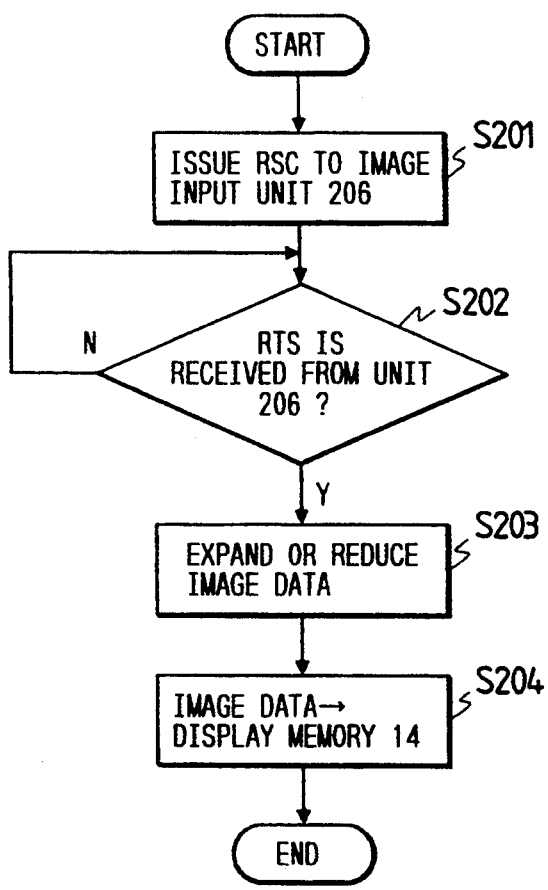
FIG. 30 is a flowchart for illustrating a control procedure performed by a CPU 201 of the third embodiment when reading image data from an input image.

First, as shown in the flowchart of FIG. 30, the CPU 201 of the system sends a signal representing conditions of a reading of image data for setting a tone curve, as well as a reading-operation starting command, to the CPU 210 of the image input unit 206 in step S201. Then, the image input unit 206 reads image data from an image and transfers the read image data to the image memory 3 sequentially. Thereafter, if the CPU 201 accepts a reading-operation terminating signal issued by the image input unit 206 in step S202, the CPU 201 expands or reduces the image data stored in the page memory 3 in accordance with the resolution of the CRT 5 in step S203. Subsequently, the expanded or reduced image data is written to the display memory 4 in step S204. The image data written to the display memory 4 is displayed in the CRT 5.

On the other hand, if the CPU 210 of the image input unit 206 receives a reading-operation starting command from the CPU 201 in step S211 as illustrated in FIG. 18, the CPU 210 sets a tone curve in the tone correction circuit 14 in step S212. Further, the CPU 210 starts an operation of reading a draft image in step S213. Then, the CPU 210 issues a sampling-operaton starting signal to the gate circuit 17. When starting the operaton of reading the dragt picture, the draft picture is irradiated and thereafter light reflected by the draft picture focuses into an image on the CCD 11. This light is converted by the CCD 11 into an electric signal. Subsequently, the electric signal is further converted by the A/D converter 12 into an 8-bit digital signal. Thereafter, the shading correction circuit 13 performs a shading correction on the 8-bit digtal signal. Further, the 8-bit image data obtained as a result of the shading correction is input to both of the tone correction circuit 14 and the gate circuit 17.

Figure 32:
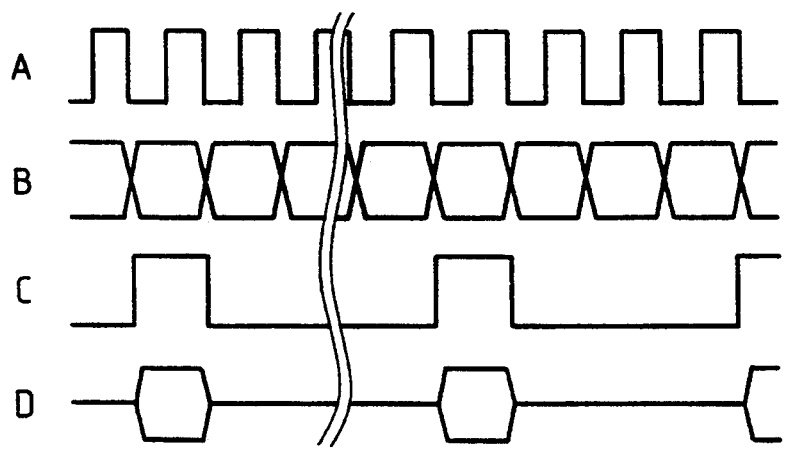
FIG. 32 is a timing chart for illustrating an operation of "extracting" or sampling density data in case of the third embodiment.
Figure 31:
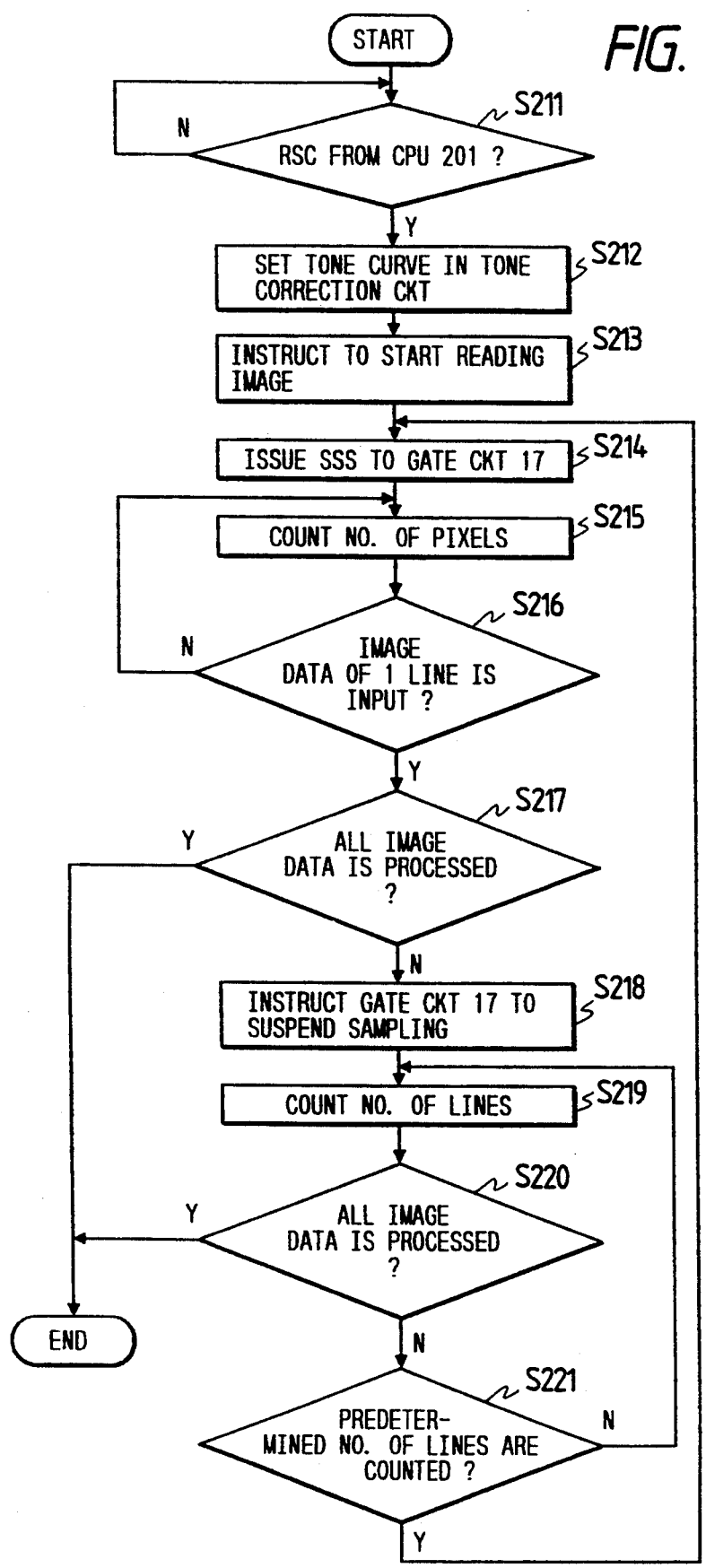
FIG. 31 is a flowchart for illustrating a control procedure performed by a CPU 210 of the third embodiment when reading image data from an input image.

As is shown in FIG. 32, the counter 216 outputs a signal C to the gate circuit 17 each time when counting "4" preset by the CPU 210, in synchronization with an outputting of the image data from the shading correction circuit 13 (see a fundamental clock A and a digital image signal B). The gate circuit 17 is enabled in response to the signal output from the counter 216 and samples the image data output from the shading correction circuit 13 at a sampling rate and writes an output signal D representing the sampled data to the memory 220 through the buffer 18 and the transfer circuit 219. At that time, the CPU 210 counts the pixels of the image represented by the image data input to the gate circuit 17 in step S215. If the CPU 210 judges in step S216 that the image data of 1 line is input therto, and further judges in step S217 that not all of the image data has been processed, the CPU 210 instructs the gate circuit 17 to suspend the sampling. In response to such sn instruction from the CPU 210, the gate circuit 17 suspends the sampling of the image data to be written to the memory 220.

Even when the gate circuit 17 suspends the sampling of the image data, the CPU 210 counts the image data of each line by counting the pixels of the image data input to the circuit 17 in step S219 similarly as in steps S215 and S216. Subsequently, if the CPU 210 judges in step S220 that not all of the image data have not been processed, and further judges in step S221 that the processing of the image data of a predetermined number of lines stored in the counter 206 has been finished, the control procedure returns to step S214, whereupon the CPU 210 issues a sampling-operation starting signal to the gate circuit 17. Thus, the read image is converted into the binary image, which is displayed on the screen of the CRT 5, and the read multi-level image data is sampled at a predetermined rate and the sampled image data is stored in the memory 220.

2. TONE CORRECTION

Figures 33, 34:
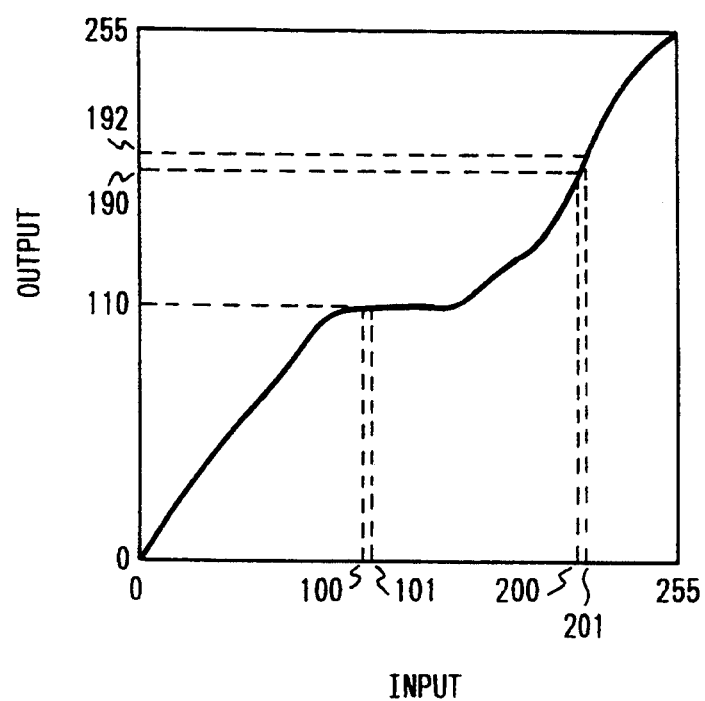
FIG. 33 is a diagram for illustrating how data representing a density correction curve is stored in the third embodiment.
FIG. 34 is a graph for showing an example of the density correction curve employed in the third embodiment.

In the tone correction circuit 14, a RAM having a storage area of 256 bytes as illustrated in FIG. 33 is provided. In the storage area of this RAM, tone levels (namely, density levels) represented by output image data, which would be obtained as a result of a tone correction, are set by the CPU 210 at locations thereof, the addresses of which respectively have values equal to tone levels represented by input image data, at the time of initialization of the RAM prior to the reading of the input image. Namely, predetermined relation between tone levels of output image data and tone levels of input image data (namely, the conversion relation) is initially established in the storage area of the RAM by the CPU 210. For instance, in case where the conversion relation represented by a tone curve of FIG. 34 is established therein, image data indicating a tone level of 110, which are stored at locations respectively having addresses of 100 and 101 of the RAM of FIG. 33, are output therefrom correspondingly to tone levels of 100 and 101 represented by input image data. Further, in such a case, image data respectively indicating tone levels of 190 and 192, which are stored at locations respectively having addresses of 200 and 201 of the RAM of FIG. 33, are output therefrom respectively corresponding to tone levels of 200 and 201 represented by the input image data. As described above, a tone correction is performed according to the established tone curve by fetching data stored at locations of the storage area of the RAM respectively corresponding to addresses, which are indicated by tone levels represented by the input image data, and then outputting the fetched data as the output image data.

3. SETTING OF TONE CURVE

In the magnetic disk 2, a storage area having the same structure as the RAM of the tone correction circuit 14 does as illustrated in FIG. 33 is provided. Further, data representing an initial conversion relation indicated by the initial (tentative) tone curve is stored for displaying the tone curve in this storage area of the magnetic disk 2. The CPU 201 reads density data (namely, initial value data), which is stored in the storage area of the magnetic disk 2 according to the relation indicated by the initial tone curve, therefrom. Then the CPU 101 generates data (hereunder sometimes referred to as display data) representing a graph of the initial tone curve, of which the horizontal axis denotes the density levels (namely, addresses in the storage area of the magnetic disk 2) represented by input image data and the vertical axis designates the those represented by output image data (stored at locations having the addresses in the storage area of the magnetic disk 2), according to the initial value data. Further, the generated display data is stored in the display memory 4. Subsequently, the initial tone curve for a tone correction as illustrated in FIG. 34 is displayed on the screen of the CRT 5 according to the display data. This tone curve is transformed into a desired curve by using the mouse 9 and executing a program employing known graphic processing techniques. Thereafter, the CPU 201 sends coordinate data representing coordinates of the modified tone curve to the CPU 210 of the image input unit 206. At that time, the coordinate data sent from the CPU 201 is set in the RAM of the tone correction circuit 14 by the CPU 210

4. GENERATION OF BINARY IMAGE (OR HALFTONE-DOT IMAGE)

The binarization circuit 15 converts the multi-level image data corrected by the tone correcton circuit 14 into binary image data (or halftone-dot image data). In this circuit, the density (namely, the tone level) represented by the density data of each pixel output from the tone correction circuit 14 is compared with the value set at a corresponding cell of the halftone-dot pattern table of FIG. 35 established therein. If the tone level of a pixel is larger than the value set at the corresponding cell of the table, the color of the pixel is determined as black (corresponding to a value of 1). Conversely, if the tone level of a pixel is smaller than the value set at the corresponding cell of the table, the color of the pixel is determined as white (corresponding to a value of 0).

Figures 35, 36:
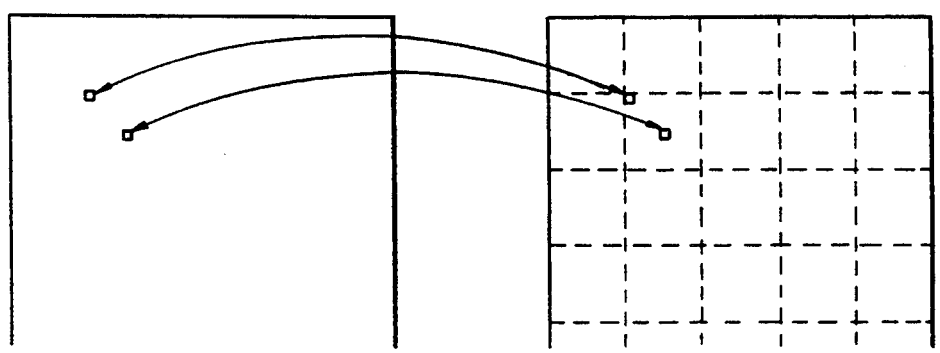
FIG. 35 is a diagram for illustrating a halftone-dot pattern table employed in the third embodiment.
FIG. 36 is a diagram for illustrating the relation between the half-dot pattern table and the pixels of the draft image, which is employed in the third embodiment.

The same halftone-dot pattern table is repeatedly used to be compared with image data of pixels of the same number as of cells thereof. FIG. 36 illustrates the relation between each pixel of the input image and a corresponding cell of the halftone-dot pattern table diagramatically. As is apparent from this figure, each pixel of the input image is in one-to-one correspondence relation with a cell of the halftone-dot pattern table.

The binarization circuit 115 has 33 kinds of halftone-dot pattern tables, the size of which ranges from $4 \times 4$ to $36 \times 36$. Further, a desired one of the tables can thus be used according to an indication from the CPUs 201 and 210 based on a direction input from the keyboard 8 by an operator.

5. DISPLAYING OF DENSITY

Figure 37:
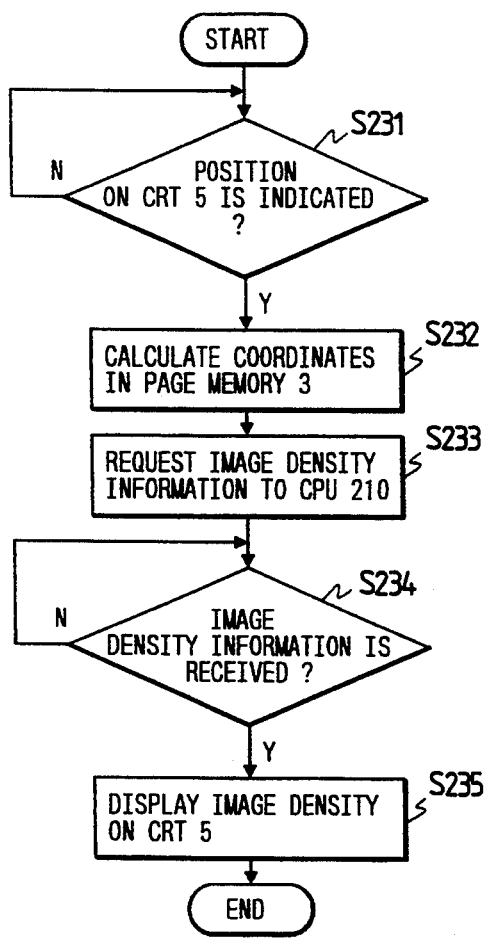
FIG. 37 is a flowchart for illustrating a control procedure performed by the CPU 201 of the third embodiment when effecting an operation of displaying density data.
Figure 38:
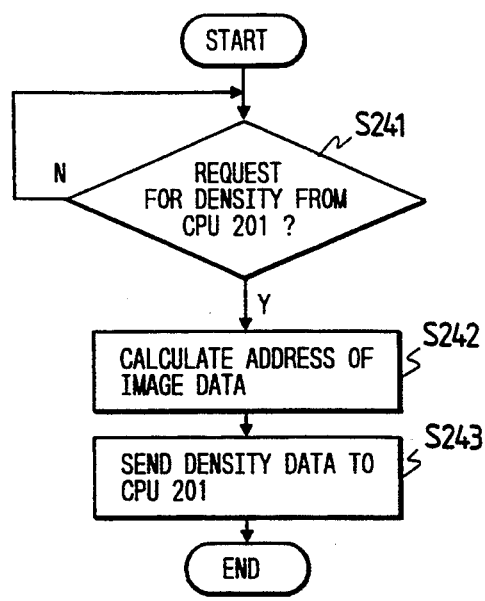
FIG. 38 is a flowchart for illustrating a control procedure performed by the CPU 210 of the third embodiment when effecting an operation of displaying density data.
Figure 39:
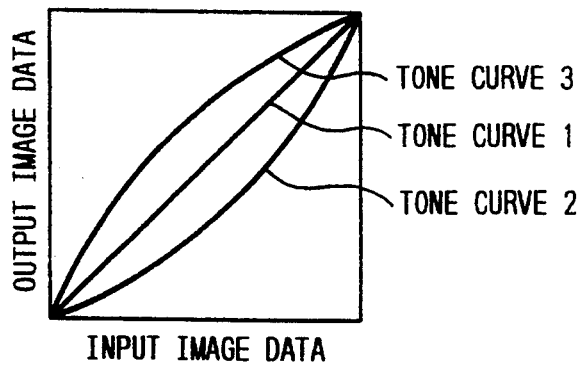
FIG. 39 is a diagram for illustrating a tone curve for a density correction.
Figure 40:
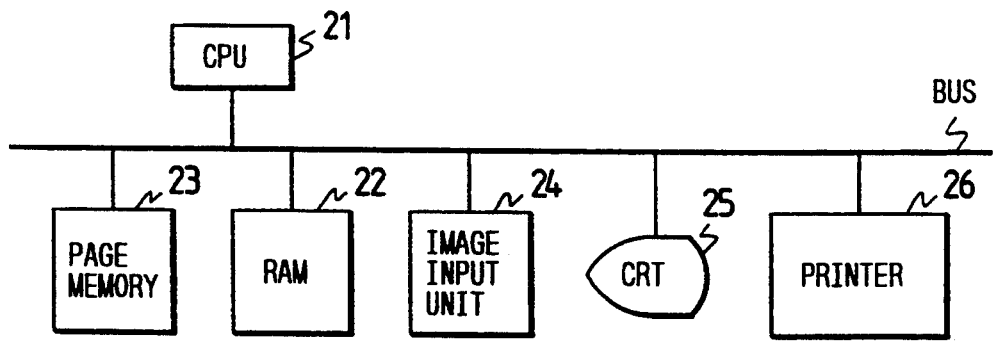
FIG. 40 is a schematic block diagram for illustrating the configuration of a conventional image processing system.
Figure 41:
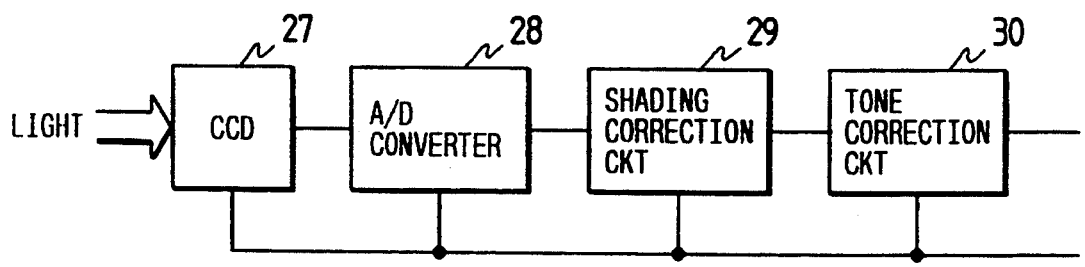
FIG. 41 is a schematic block diagram for illustrating the configuration of an image input unit of the conventional image processing system.

An operation of displaying density data is controlled by the CPUs 201 and 210 in accordance with the flowcharts of FIGS. 37 and 38. First, if a position in an image displayed on the screen of the CRT 5 is indicated by using the mouse 9 in step S231, the CPU 201 calculates an address in the page memory 3 (corresponding to coordinates in the read draft picture) from the indicated position or coordinates on the screen of the CRT 5 in step S232. Then, in step 233, the CPU 201 issues the CPU 210 of the image input unit 106 with singals representing the calculated coordinates and a command requesting the density level corresponding to the calculated coordinates. Thereafter, if the CPU 201 receives image density information from the image input unit 206 in step S234, the density represented by the received information is displayed in step S235 in the vicinity of a position, which is indicated by a cursor, on the screen of the CRT 5 as illustrated in FIG. 12.

On the other hand, if the CPU 210 accepts information representing the calculated coordinates and the command requesting the corresponding density from the CPU 201 in step S241, the CPU 210 computes an address of the memory 220, at which the sampled corresponding image data are stored, from the coordinates received from the CPU 201 in step S242 and subsequently, in step S243, the CPU 210 outputs the density data stored at the address to the CPU 201.

6. THE RELATION BETWEEN THE SIZE OF THE HALFTONE-DOT PATTERN TABLE AND A SAMPLING PERIOD

As described above, generally, in case where a halftone image is represented by a binary output device, halftone is approximately represented by effecting a halftone-dot generation processing similarly as in case of this embodiment. Namely, halftone is approximately represented by regulating a rate of an area of black pixels to a unit block or area composed of a plurality of pixels, Thus, the density of a position in an image is represented by using a block of a predetermined size. Therefore, in case where the density at a position in a halftone-dot image is obtained by indicating the position in the halftone-dot image and then reading the multi-level density data stored in a memory, it is of no significance to store plural multi-level data correspondingly to a unit block.

The data output to the CRT 5 and the printer 7 is halftone-dot image data. It is, accordingly, sufficient for knowing the density at a desired position in a displayed image to set the number of pixels, the corresponding density data of which should be sampled, as equal to or less than the maximum size of the halftone-dot pattern table.

As stated above, in case of the third embodiment, a read multi-level image data is converted to binary image data and the binary image data is stored in the image memory. Moreover, the multi-level image data itself is sampled, and the sampled data is stored in the memory. Thus, the necessary memory capacity can be reduced or saved. Further, the density at a position in the read image can easily be known and provided as reference data for setting a tone curve for a tone correction.

Furthermore, in case of the second embodiment, the number of the pixels, the corresponding density data of which should be sampled, is set as equal to or less than that of blocks to be converted into halftone dots. Thus, the multi-level data can be sampled by using only the minimum memory capacity required for obtaining image density information. In case of the third embodiment, the memory capacity required for obtaining image density information is $1/(38 \times 38) = 1/1296$ times that required in case of storing all of the multi-level data of the entire draft picture.

Incidentally, the sampled multi-level image data is stored in the first embodiment. Thus, a roughly estimated distribution of densities of a draft picture can be obtained and also used as effective reference data for setting a tone curve for a tone correction.

Additionally, in case of the third embodiment, a read multi-level image data is converted to binary image data and the binary image data is stored in the image memory.

Moreover, the multi-level image data itself is sampled at a sampling rate larger than a rate of the number of halftone dots to the number of all of the pixels, and the sampled data is stored in the memory. Thus, the necessary memory capacity can be reduced or saved. Further, the density at a position in the read image can easily be known and provided as reference data for setting a tone curve for a tone correction.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An image processing system, comprising:
    reading means for outputting multi-level image data corresponding to a density of each of pixels, to which an image of a draft is partitioned;
    sampling means for obtaining density data by sampling the image data output from the reading means at a predetermined rate of the number of the pixels, which correspond to image data to be sampled, to that of all of the pixels;
    storing means for storing the density data obtained by the sampling means;
    image processing means for performing a processing on the image data output from the reading means;
    displaying means for displaying an image represented by data obtained as a result of the processing by the image processing means;
    indicating means for indicating a position in the image displayed by the displaying means; and
    control means for reading the density data corresponding to the position indicated by the indicating means from the storing means and making the displaying means display the read density data.

2. The image processing system according to claim 1, which further comprises:
    setting means for setting the rate of the number of the pixels, which correspond to image data to be sampled, to that of all of the pixels.

3. The image processing system according to claim 1, wherein the image processing means generates a halftone dot corresponding to each block composed of a plurality of the pixels.

4. An image processing system, comprising:
    reading means for outputting multi-level image data corresponding to a density of each of pixels, to which an image of a draft is partitioned;
    sampling means for obtaining density data by sampling the image data output from the reading means at a predetermined rate of the number of the pixels, which correspond to image data to be sampled, to that of all of the pixels;
    storing means for storing the density data obtained by the sampling means;
    halftone-dot processing means for performing a halftone-dot processing, the halftone-dot processing means generating a halftone dot from each block composed of the pixels by assigning one of a plurality of binary density levels to a part of the pixels of each of the blocks to obtain a density to be represented by the corresponding block;
    displaying means for displaying an image represented by data obtained as a result of the processing by the halftone-dot processing means;
    indicating means for indicating a position in the image displayed by the displaying means and outputting information representing the indicated position; and
    control means for making the displaying means display the data stored in the storing means according to the information representing the indicated position.

5. The image processing system according to claim 4, which further comprises a rate determining means for determining the rate of the number of the pixels, which correspond to image data to be sampled, to that of all of the pixels according to the number of pixels composing each block, from which a halftone dot is generated by the halftone-dot processing means.

6. The image processing system according to claim 4, wherein, the sampling means samples the image data every pixels of the same number as of the pixels composing each block, from which a halftone dot is generated by the halftone-dot processing means.

7. The image processing system according to claim 4, wherein, the sampling means samples the image data every pixels of the number, which is less than the number of the pixels composing each block, from which a halftone dot is generated by the halftone-dot processing means.

8. The image processing system according to claim 4, wherein, the sampling means samples the image data every pixels of the number, which is more than the number of the pixels composing each block, from which a halftone dot is generated by the halftone-dot processing means.

9. A method for performing an image processing comprising the steps of:
    partitioning an image of a draft into a plurality of pixels;
    reading multi-level image data corresponding to a density of each of the pixels;

obtaining density data by sampling the image data predetermined rate of the number of the pixels, which correspond to image data to be sampled, to that of all of the pixels;

storing the density data obtained by the sampling of the image data;

displaying an image represented by the density data;

specifying an indicated position in the displayed image; and reading the density data corresponding to the specified position in the displayed image; and displaying the read density data corresponding to the specified position.

10. An image processing system, comprising:

reading means for outputting multi-level digital image data corresponding to a density of each of pixels, to which an image of a draft is partitioned;

sampling means for obtaining multi-level digital density data by sampling the multi-level image data output from the reading means at a predetermined rate of the number of the pixels, which correspond to multi-level image data to be sampled, to that of all of the pixels;

storing means for storing the multi-level density data sampled by the sampling means;

image processing means for generating a halftone-dot image by assigning one of binary density levels to each of the pixels having tone levels greater than a predetermined value corresponding to each cell of a halftone-dot pattern table, the tone level being represented by the multi-level density data corresponding to each of the pixels;

displaying means for displaying the halftone-dot image obtained by the image processing means;

indicating means for indicating a position in the halftone-dot image displayed by the displaying means; and control means for reading the density data corresponding to the position indicated by the indicating means from the storing means and making the displaying means display the read density data, wherein under the control of the control means, the display means displays a numerical value of a tone level represented by the read density data near the position in the halftone-dot image, which position is indicated by the indicating means.

11. The image processing system according to claim 10, which further comprises a rate determining means for determining the rate of the number of the pixels, which correspond to image data to be sampled, to that of all of the pixels according to the number of pixels composing each block, from which a halftone-dot is generated by the image processing means.

12. The image processing system according to claim 10, wherein the sampling means samples the image data every pixels of the same number as of the pixels composing each block, from which a halftone-dot is generated by the image processing means.

13. The image processing system according to claim 11, wherein the sampling means samples the image data every pixels of the number, which is less than the number of the pixels composing each block, from which a halftone-dot is generated by the image processing means.

14. The image processing system according to claim 12, wherein, the sampling means samples the image data every pixels of the number, which is more than the number of the pixels composing each block, from which a halftone-dot is generated by the image processing means.

15. An image processing system, comprising:

reading means for outputting multi-level digital image data corresponding to a density of each of pixels, to which an image of a draft is partitioned;

sampling means for obtaining multi-level data digital density data by sampling the multi-level image data output from the reading means at a predetermined rate of the number of the pixels, which correspond to multi-level image data to be sampled, to that of all of the pixels;

first storing means for storing the multi-level density data sampled by the sampling means;

image processing means for generating a halftone-dot image by producing halftone dots from each block composed of the pixels, the image processing means assigning one of binary density levels to the pixels of each block, which have tone levels greater than a predetermined value corresponding to each cell of a halftone-dot pattern table, the tone level being represented by the multi-level density data corresponding to each pixel;

second storing means for storing halftone-dot data corresponding to each of the produced halftone dots;

displaying means for displaying the halftone-dot image represented by the halftone-dot data stored in the second storing means;

indicating means for indicating a position in the halftone-dot image displayed by the displaying means; and control means for reading the density data corresponding to the position indicated by the indicating means from the first storing means and making the displaying means display the density data stored in the first storing means, wherein under the control of the control means, the display means displays a numerical value of a tone level represented by the read density data near the position in the halftone-dot image, which position is indicated by the indicating means.

16. A method for performing an image processing, comprising the steps of:

partitioning an image of a draft into a plurality of pixels;

reading multi-level digital image data corresponding to a density of each of the pixels;

obtaining multi-level digital density data by sampling the multi-level image data at a predetermined rate of the number of the pixels, which correspond to image data to be sampled to that of all of the pixels;

storing the multi-level digital density data obtained by the sampling of the image data;

displaying an image represented by the density data;

specifying an indicated position in the displayed image; and reading the density data corresponding to the specified position in the displayed image; and displaying the read density data near the specified position in the displayed image.

* * * * *